United States Patent
Ramanujam

(10) Patent No.: US 12,475,324 B2
(45) Date of Patent: Nov. 18, 2025

(54) ARTIFICIAL INTELLIGENCE-ENABLED SYSTEM AND METHOD FOR AUTHORING A SCIENTIFIC DOCUMENT

(71) Applicant: Ilango Ramanujam, Plainsboro, NJ (US)

(72) Inventor: Ilango Ramanujam, Plainsboro, NJ (US)

(73) Assignee: ZYLIQ INC., Princeton, NJ (US)

( * ) Notice: Subject to any disclaimer, the term of this patent is extended or adjusted under 35 U.S.C. 154(b) by 393 days.

(21) Appl. No.: 17/940,019

(22) Filed: Sep. 8, 2022

(65) Prior Publication Data

US 2024/0086647 A1    Mar. 14, 2024

(51) Int. Cl.
*G06F 40/40* (2020.01)
*G06F 16/34* (2019.01)
*G06F 40/186* (2020.01)
*G06V 30/41* (2022.01)

(52) U.S. Cl.
CPC ............ *G06F 40/40* (2020.01); *G06F 16/345* (2019.01); *G06F 40/186* (2020.01); *G06V 30/41* (2022.01)

(58) Field of Classification Search
CPC ....... G06F 40/40; G06F 16/345; G06F 40/186
USPC .......................................................... 704/9
See application file for complete search history.

(56) References Cited

U.S. PATENT DOCUMENTS

| | | | |
|---|---|---|---|
| 7,386,442 B2 * | 6/2008 | Dehlinger | G06F 16/35 707/999.005 |
| 10,664,558 B2 * | 5/2020 | Mahamood | G06F 40/56 |
| 2007/0203869 A1 | 8/2007 | Ramsey et al. | |
| 2011/0060761 A1 | 3/2011 | Fouts | |

(Continued)

OTHER PUBLICATIONS

Buchkremer et al. "The application of artificial intelligence technologies as a substitute for reading and to support and enhance the authoring of scientific review articles". IEEE Access 7 (2019): 65263-65276. May 20, 2019 (May 20, 2019) Retrieved on Jan. 7, 2023 (Jan. 7, 2023) from <https://ieeexplore.ieee.org/abstract/document/8718286>.

(Continued)

*Primary Examiner* — Richemond Dorvil
*Assistant Examiner* — Rodrigo A Chavez
(74) *Attorney, Agent, or Firm* — Ashok Tankha

(57) ABSTRACT

A system and a method for automatically authoring a scientific document using a machine learning model and natural language processing (NLP) with minimal user intervention are provided. The system configures a scientific document template including multiple sections based on scientific document requirements. The system maps the sections in the scientific document template with content from the source documents by executing a section mapping algorithm and automatically generates the scientific document. The mapping includes matching the sections of the scientific document template with sections extracted from the source documents, and predicting appropriate sections in the scientific document template for rendering the content (Continued)

from the source documents based on the matching using the machine learning model and historical scientific document information. The system executes one or more content editing functions, for example, tense conversion, additional information fetch and display, post-text to in-text conversion, etc., on the scientific document using NLP.

20 Claims, 56 Drawing Sheets

(56) References Cited

U.S. PATENT DOCUMENTS

| | | | |
|---|---|---|---|
| 2012/0016678 A1 | 1/2012 | Gruber et al. | |
| 2018/0267950 A1* | 9/2018 | de Mello Brandao | G06F 40/30 |
| 2019/0260764 A1* | 8/2019 | Humphrey | H04L 63/1425 |
| 2019/0311003 A1* | 10/2019 | Tonkin | G06N 5/022 |
| 2021/0182486 A1* | 6/2021 | Yoo | G06F 40/47 |
| 2022/0050960 A1* | 2/2022 | Sanyasi | G06F 40/186 |
| 2022/0366344 A1* | 11/2022 | Shi | G06Q 10/06393 |
| 2023/0005573 A1* | 1/2023 | Ramanujam | G06F 40/169 |
| 2023/0325590 A1* | 10/2023 | Shevchenko | G06F 40/186 715/200 |
| 2024/0086647 A1* | 3/2024 | Ramanujam | G06F 40/103 |
| 2024/0394422 A1* | 11/2024 | Kumar | G06F 30/27 |

OTHER PUBLICATIONS

Getahun. "After an AI bot wrote a scientific paper on itself, the researcher behind the experiment says she hopes she didn't open a 'Pandora's box'." Insider. Jul. 9, 2022 (Jul. 9, 2022) Retrieved on Jan. 7, 2023 (Jan. 7, 2023) from <https://www.insider.com/artificial intelligence-bot-wrote-scientific-paper-On-itself-2-hours-2022-7#:~:text=An%20artifical%2Dintelligence%20algorithm%20called,researcher%20wrote%20in%20scientific%20American.>.

Marr. "Artificial Intelligence Can Now Write Amazing Content—What Does That Mean For Humans?" Forbes. Mar. 29, 2019 (Mar. 29, 2019) Retrieved on Jan. 7, 2023 (Jan. 7, 2023) from <https://www.forbes.com/sites/bernardmarr/2019/03/29/artificial-intelligence-can-now-write-amazing-content-what-does-that-mean-for-humans-//sh=5e71207150ab>.

* cited by examiner

| | SYMBIANCE-21 SYMBIANCE ▶ | | CSR Template | ☒ ☒ |
|---|---|---|---|---|
| 1 | TITLE PAGE | | | |
| 2 | STUDY SYNOPSIS | | | |
| 3 | TABLE OF CONTENTS | | | |
| 4 | LIST OF ABBREVIATIONS & DEFINITION OF TERMS | | | |
| 5 | ETHICS AND REGULATORY APPROVAL | | | ▶ |
| 6 | INVESTIGATORS AND STUDY ADMINISTRATIVE STRUCTURE | | | |
| 7 | INTRODUCTION | | | |
| 8 | STUDY OBJECTIVES | | | |
| | 8.1 | PRIMARY OBJECTIVE | | |
| | 8.2 | SECONDARY OBJECTIVE | | |
| | 8.3 | EXPLORATORY OBJECTIVE | | |

FIG. 10C

9.1.2 Treatment Phase

The duration of the Treatment Phase will be a maximum of 27 weeks and will include 3 periods: Titration, Maintenance, and Follow-up. Subjects whose screening assessments and evaluations are completed and reviewed by the PI and who continue to meet all of the inclusion/exclusion criteria will enter the Treatment Phase.

FIG. 10H

In the event a subject discontinues the study early for any reason after Visit 2 in Core Study, an Early Discontinuation Visit is performed. The subject should also be returned 4 weeks (±7 days) after Visit 9 or the last dose of study drug to complete the Follow-up Visit procedures. In the event a subject discontinues studying early for any reason before Visit 12 in Extension Phase, an Early Discontinuation Visit is performed. The Subject Disposition CRF was completed indicating the primary reason for discontinuation and all other reasons contributing to the subject's discontinuation from treatment. In addition, the date of the last dose of the study drug was recorded on the Study Drug Dosing CRF.

9.4 TREATMENTS

9.4.1 TREATMENTS ADMINISTERED

Core Study

Pretreatment Phase:

The Pretreatment Phase consisted of a Screening/Baseline Period that lasted 4 weeks ±3 days. During this phase, subjects continued to take their baseline AEDs regimen as allowed per inclusion/exclusion criteria. No study drug was administered to subjects during this phase.

| Clinical Study Report ||
|---|---|
| Study Title: | An Open-Label, Multicenter Study with an Extension Phase to Evaluate the Safety, Tolerability, and Exposure-Efficacy Relationship of Test drug Oral Suspension when Administered as an Adjunctive Therapy in Pediatric Subjects (Age 4 to less than 12 years) with Inadequately Controlled Partial-Onset Seizures or Primary Generalized Tonic-Clonic Seizures |
| Investigational Drug Name: | EX2007/test drug |
| Indication: | Partial-Onset Seizures or Primary Generalized Tonic-Clonic Seizures |
| Protocol Number: | SYMBIANCE-21 |
| Drug Development Phase: | 3 |
| Study Initiation Date: | |
| Study Completion Date: | |
| GCP Statement: | This study was conducted in compliance with the Declaration of Helsinki and Good Clinical Practice or Trials on Medicinal Products, including archiving of essential study documents. |
| Date of Report: | 03-18-2022 |

> 9 INVESTIGATIONAL PLAN
>
> 9.1 Overall Study Design and Plan
>
> This is a multicenter, open-label single-arm study in children (ages 4 to <12 years) with inadequately controlled POS or PGTC. The study will consist of a Core Study and Extension Phase. Subjects will be stratified by age (≥4 to <7 years, 7 to <12 years) with at least 30% subjects enrolled in the equal or greater than 4 to less than 7 year age group for each seizure type (ie, at least 36 with POS and at least 12 with PGTC).
>
> <u>Core Study</u>
>
> The Core Study will consist of the following 2 phases: Pretreatment and Treatment Phase.
>
> The Pretreatment Phase will consist of a Screening/Baseline Period that lasts 4 weeks ±3 days. During this phase, subjects will be assessed for eligibility to participate in the study.
>
> The Treatment Phase will consist of 3 periods: Titration (up to 11 weeks), Maintenance (12 weeks), and Follow-up (4 weeks; only for those subjects not rolling over into the Extension Phase).

> 9 INVESTIGATIONAL PLAN
>
> 9.1 OVERALL STUDY DESIGN AND PLAN
>
> This is a multicenter, open-label single-arm study in children (ages 4 to <12 years) with inadequately controlled POS or PGTC. The study will consist of a Core Study and ExtensionPhase. Subjects will be stratified by age (≥4 to <7 years, 7 to <12 years) with at least
>
> 30% subjects enrolled in the equal or greater than 4 to less than 7 year age group for eachseizure type (ie, at least 36 with POS and at least 12 with PGTC).
>
> <u>Core Study</u>
>
> The Core Study will consist of the following 2 phases: Pretreatment and Treatment Phase.The
>
> Pretreatment Phase will consist of a Screening/Baseline Period that lasts 4 weeks
>
> ±3 days. During this phase, subjects will be assessed for eligibility to participate in the
>
> study.
>
> The Treatment Phase will consist of 3 periods: Titration (up to 11 weeks), Maintenance(12 weeks), and Follow-up (4 weeks; only for those subjects not rolling over into the Extension Phase).

FIG. 10N

9 INVESTIGATIONAL PLAN

9.1 Overall Study Design and Plan

This is a multicenter, open-label single-arm study in children (ages 4 to <12 years) with inadequately controlled POS or PGTC. The study will consist of a Core Study and Extension Phase. Subjects will be stratified by age (≥4 to <7 years, 7 to <12 years) with at least 30% subjects enrolled in the equal or greater than 4 to less than 7 year age group for each seizure type (ie, at least 36 with POS and at least 12 with PGTC).

<u>Core Study</u>

The Core Study will consist of the following 2 phases: Pretreatment and Treatment Phase.

The Pretreatment Phase will consist of a Screening/Baseline Period that lasts 4 weeks ±3 days. During this phase, subjects will be assessed for eligibility to participate in the study.

The Treatment Phase will consist of 3 periods: Titration (up to 11 weeks), Maintenance (12 weeks), and Follow-up (4 weeks; only for those subjects not rolling over into the Extension Phase).

FIG. 10O

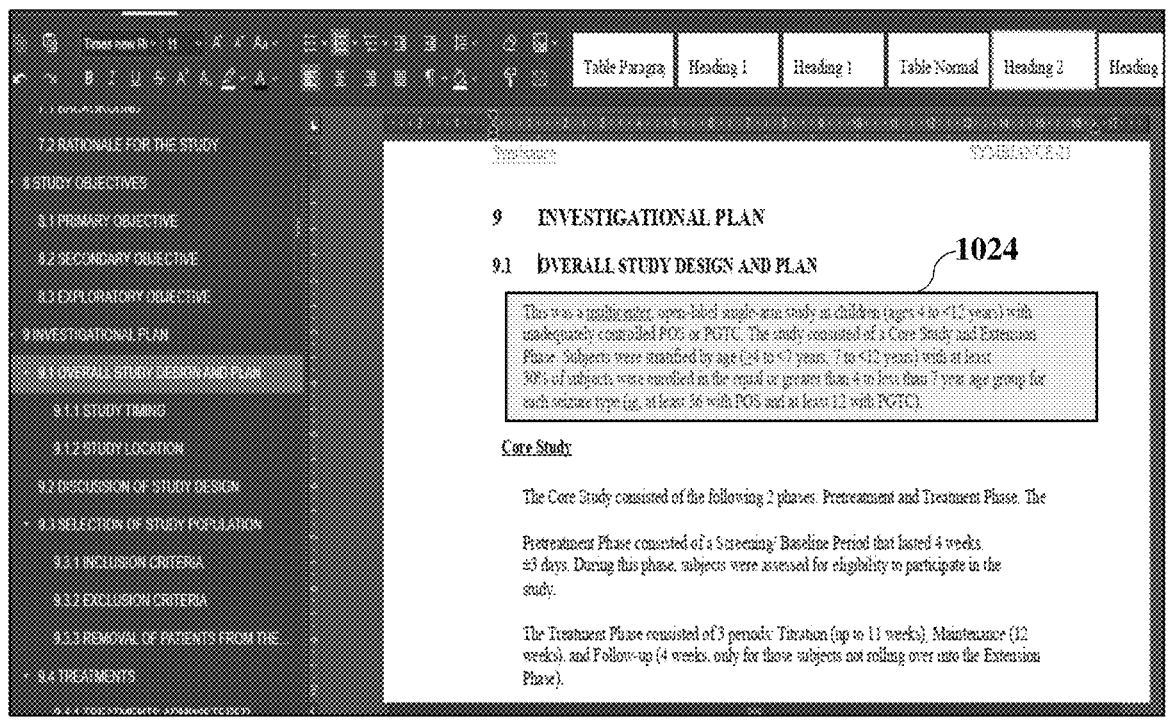

```
check if files are uploaded
if files are empty
   do:
      throw error
else
   do:
      start the process and fetch the uploaded files from the database
      foreach stream of uploaded files
      if file is Protocol
         do:
            read the toc
            split the document based on toc
            map the protocol sections based on CSR sections
            fetch the title page and synopsis content
            extract the abbreviations from the document
            update the content to past tense
         end
      else if file is SAP
         do:
            read the toc
            split the document based on toc
            map the protocol sections based on CSR sections
            fetch the title page and synopsis content
            extract the abbreviations from the document
            update the content to past tense
         end
      else if file is Safety Narrative
         do:
            read and copy the content of the document to safety narrative sections
         end
      else if file is Intext
         do:
            read the document
```

FIG. 12A

```
        Identify the available tables
        split the document based on the identified table names
        map the intext table
        generate intext table summary
        if safety narrative document is not uploaded
            do:
                generate the narrative based on the uploaded table
            end
        end
    else if file is Synopsis
        do:
            read and copy the content of the document to safety narrative sections
        end
    finally
        do:
            generate CSR based on the previous process and display in editor
        end
    end
end
```

FIG. 12B

```
import os
import random
import re
import string
import subprocess
from difflib import SequenceMatcher
from itertools import tee import pickle
import traceback
from more_itertools.recipes import unique_everseen
import camelot
import fitz
import gensim
import numpy as np
import pandas as pd
import tabula
from bs4 import BeautifulSoup
from flask import jsonify
from fuzzywuzzy import fuzz
from gensim.models import KeyedVectors
from gingerit.gingerit import GingerIt
from nlg.search import templatize
from pattern.en import conjugate, PAST, PRESENT, parse
from sklearn.feature_extraction.text import TfidfVectorizer, CountVectorizer
from sklearn.neural_network import MLPClassifier
from nltk.tokenize import sent_tokenize
import ml_models
from data_access import *
from services import make_db_connection, log_details
from pattern.en import conjugate, PAST, PRESENT, SINGULAR, PLURAL
import spacy
from spacy.symbols import NOUN
```

FIG. 13A

```
import pandas as pd
import numpy as np
from nltk.corpus import stopwords
sw=stopwords.words('english')

def get_exact_matches_Prot(csr_temp_sec,csr_temp_sec1, csr_temp_sec2,db, study_id,
study_type):
    try:

dic1 = {}
        final = {}
        final2 = {}
        Swapped_model=getsponsor(db,study_id)[0][0]

try:
            sap_list = getCSR_toc(db, study_id, 'SAP')
        except:
            logger.error("No records found")
            return {} lis=getSourceList(csr_temp_sec,"Protocol")
        lisid2=getSourceList(csr_temp_sec,"Sap")
        final2={}
        if('janssen' in Swapped_model.lower()):
            predict_model=ml_models.model_dict['loaded_model_jnj']
            predict_counter=ml_models.model_dict['counter_jnj']
            predict_label=ml_models.model_dict['label_section_jnj']
        elif('sunovion' in Swapped_model.lower()):
            predict_model=ml_models.model_dict['loaded_model_Sunovian']
            predict_counter=ml_models.model_dict['counter_Sunovian']
            predict_label=ml_models.model_dict['label_section_Sunovian']
        else:
```

FIG. 13B

```
predict_model=ml_models.model_dict['loaded_model_base']
predict_counter=ml_models.model_dict['counter_base']
predict_label=ml_models.model_dict['label_section_base']
res = [i for i in csr_temp_sec if not (i[3] == 0)]
for i in range(len(res)):
    arr=[]
    check_flag=0
    if (res[i][0] in lis):
        for j in range(0, len(csr_temp_sec2)):
            distance = ml_models.model_dict['model_3'].wmdistance(clean_text(res[i][1]),
                                clean_text(csr_temp_sec2[j][1]))

if (distance < 0.30):
                final2[res[i][0]]=csr_temp_sec2[j][0]
                check_flag=1
                break else:
                xtrain = predict_counter.transform([csr_temp_sec2[j][1]])
                pred=predict_model.predict(xtrain)
                pred_prob = predict_model.predict_proba(xtrain)
                label1=predict_label.inverse_transform(pred)[0]
                prob = (np.sort(pred_prob)[:, -1:]).tolist()[0]

if (prob[0]>0.80 and label1.upper()==res[i][1].upper()):
                    arr.append((csr_temp_sec2[j][0],prob[0]))

if(len(arr) and check_flag==0):
            sort_val= sorted(arr, key=lambda arr: arr[1],reverse=True)
            final2[res[i][0]]=sort_val[0][0]
```

FIG. 13C

```
if(sap_list):
    for i in range(len(res)):
        arr=[]
        if (res[i][0] in lisid2):
            for j in range(0, len(sap_list)):
                distance = ml_models.model_dict['model_3'].wmdistance(clean_text(res[i][1]),
                                                                       clean_text(sap_list[j][2]))

if (distance < 0.30):
                    final2[res[i][0]]=sap_list[j][0]
                    check_flag=1
                    break
                else:
                    xtrain = predict_counter.transform([sap_list[j][2]])
                    pred=predict_model.predict(xtrain)
                    pred_prob = predict_model.predict_proba(xtrain)
                    label1=predict_label.inverse_transform(pred)[0]
                    prob = (np.sort(pred_prob)[:, -1:]).tolist()[0]

if (prob[0]>0.80 and label1.upper()==res[i][1].upper()):
                        arr.append((sap_list[j][0],prob[0]))

if(len(arr)):
                sort_val= sorted(arr, key=lambda arr: arr[1],reverse=True)
                final2[res[i][0]]=sort_val[0][0]

except Exception as e:

traceback.print_exc()
```

FIG. 13D

```
            final2={} fin=Eliminate_Duplicates(csr_temp_sec1,final2,db,study_id)

return fin def getUserAddedSections02(temp_lis, sec_list, db, study_id):
        output_list = []
        for ou in temp_lis:
            var=-1
            if(ou[2]==0):
                var=0
                for se in sec_list:
                    if (ou[1].startswith(str(se))):
                        var+=1
                if(var==0):
                    output_list.append((ou[0], ou[3]))
        return output_list
    def fuzzratio01_new(lis1, csr_toc_prot, csr_toc_sap, flag, abb_list={}):
        output_dic = {}
        if (flag == 1):
            no1 = 1
            no2 = 2
        else:
            no1 = 1
            no2 = 4
        for i in lis1:
            arr=[]
            check_flag = 0
            if (i[2].strip()=='Protocol,SAP'):
                tmp_flag=0
                lis3 = csr_toc_prot
                for j in lis3:
```

FIG. 13E

```
x = text_cleaner(i[no1])
y = text_cleaner(j[no2])
distance = ml_models.model_dict['model_3'].wmdistance(x,y)
if(distance < 0.30):
   tmp_flag=1
   output_dic[i[0]]=j[0]
   check_flag=1
   break
else:
   val = fuzz.token_set_ratio(x.strip(), y.strip())
   if (val > 80):
      arr.append((j[0],val))

if(arr and check_flag==0):
   sort_val= sorted(arr, key=lambda arr: arr[1],reverse=True)
   output_dic[i[0]]=sort_val[0][0]
   tmp_flag=1
if(tmp_flag==0):
   arr=[]
   check_flag = 0
   lis3 = csr_toc_sap
   for j in lis3:
      x = text_cleaner(i[no1])
      y = text_cleaner(j[no2])
      distance = ml_models.model_dict['model_3'].wmdistance(x,y)

if(distance < 0.30):
         output_dic[i[0]]=j[0]
         check_flag=1
         break
      else:
         val = fuzz.token_set_ratio(x.strip(), y.strip())
         if (val > 80):
```

FIG. 13F

```
            arr.append((j[0],val))

if(arr and check_flag==0):
            sort_val= sorted(arr, key=lambda arr: arr[1],reverse=True)
            output_dic[i[0]]=sort_val[0][0]
    else:
        lis3 = csr_toc_prot
        for j in lis3:
            x = text_cleaner(i[no1])
            y = text_cleaner(j[no2])
            distance = ml_models.model_dict['model_3'].wmdistance(x,y)
            if(distance < 0.30):
                output_dic[i[0]]=j[0]
                check_flag=1
                break
            else:
                val = fuzz.token_set_ratio(x.strip(), y.strip())
                if (val > 80):
                    arr.append((j[0],val))

if(arr and check_flag==0):
            sort_val= sorted(arr, key=lambda arr: arr[1],reverse=True)
            output_dic[i[0]]=sort_val[0][0]
return output_dic def get_exact_matches_SAP(csr_temp_sec, csr_temp_sec2,db, study_id, study_type):
arr = []
dic1 = {}
final = {}
final2 = {}

Swapped_model=getsponsor(db,study_id)[0][0]
```

FIG. 13G

```
try:
    sap_list = getCSR_toc(db, study_id, 'SAP')
except:
    logger.error("No records found")
    return {} lisid2=getSourceList(csr_temp_sec,"Sap")
if('janssen' in Swapped_model.lower()):
    predict_model=ml_models.model_dict['loaded_model_jnj']
    predict_counter=ml_models.model_dict['counter_jnj']
    predict_label=ml_models.model_dict['label_section_jnj']
elif('sunovion' in Swapped_model.lower()):
    predict_model=ml_models.model_dict['loaded_model_Sunovian']
    predict_counter=ml_models.model_dict['counter_Sunovian']
    predict_label=ml_models.model_dict['label_section_Sunovian']
else:
    predict_model=ml_models.model_dict['loaded_model_base']
    predict_counter=ml_models.model_dict['counter_base']
    predict_label=ml_models.model_dict['label_section_base']
for i in csr_temp_sec:
    var1 = i[0]
    var2 = i[1]
    dic1[var1] = (var2).lower()

for i in csr_temp_sec2:

xtrain = predict_counter.transform([i[1]])
    pred=predict_model.predict(xtrain)
    pred_prob = predict_model.predict_proba(xtrain)
    label1=predict_label.inverse_transform(pred)[0]
    prob = (np.sort(pred_prob)[:, -1:]).tolist()[0]

if (prob[0] > 0.81 and label1 != 'drop'):
```

FIG. 13H

```
        tmp = get_key(label1.lower(), dic1)
        final[i[0]] = tmp
    else:
        final[i[0]] = 0 for i in sap_list:

xtrain = predict_counter.transform([i[2]])
    pred=predict_model.predict(xtrain)
    pred_prob = predict_model.predict_proba(xtrain)
    label1=predict_label.inverse_transform(pred)[0]
    prob = (np.sort(pred_prob)[:, -1:]).tolist()[0]

if(study_type==1):
        study_typ_exp = prob[0] > 0.85
    elif(study_type==2):
        study_typ_exp = prob[0] > 0.91 and label1 != 'drop' if(study_typ_exp):
        tmp = get_key(label1.lower(), dic1)
        final2[i[0]] = tmp
    else:
        final2[i[0]] = 0 for i in range(len(csr_temp_sec)):
    if (csr_temp_sec[i][0] in lisid2):
        a = getmatch_SAP(csr_temp_sec[i][1], csr_temp_sec[i][0], db, study_id, sap_list, final2)
        if (len(a) == 2):
            arr.append((a[0], a[1]))
        else:
            a = (get_key(csr_temp_sec[i][0], final))
            if (a != 0):
```

FIG. 13I

```
            arr.append((csr_temp_sec[i][0], a))
    return arr def get_dictionary_int(lis):
    dic = {}
    for i in lis:
        val = int(i[0])
        app.logger.info(type(val))
        dic[val] = int(i[1])
    return dic def get_mapping_New(db, study_id, flag, flag2,doc_type):
    try:
        csr_temp_sec = []
        csr_temp_sec2 = []
        csr_temp_sec1 = []

try:
            csr_temp = getCSR_template_new(db, study_id)
        except:
            logger.warning("No records found in csr_study_template with the study_id",study_id)
            return {} for x in csr_temp:
            csr_temp_sec.append((x[0],x[3],x[5],x[6]))

for x in csr_temp:
            csr_temp_sec1.append((x[0],x[1],x[3]))

if(flag==1):
            file_type = 'PROTOCOL'
        elif(flag==2):
            file_type = 'SAP'
```

FIG. 13J

```
else:
    file_type='INTEXT' try:
    csr_toc = getCSR_toc(db, study_id, file_type)
    csr_toc_prot = getCSR_toc(db, study_id, 'PROTOCOL')
    csr_toc_sap = getCSR_toc(db, study_id, 'SAP')

except:
    logger.warning("No records found in csr_toc with the study_id = ", study_id," and file_type = ",file_type)
    return {} for x in csr_toc:
    csr_temp_sec2.append((x[0], x[2]))

try:
    study = getCSR_study(db, study_id)

except:
    logger.warning("No records found in csr_toc with the study_id = ", study_id, " and file_type = ", file_type)
    return {} try:
    filename="MLP_SectionModel_Retrain.sav"
    filename=os.path.join(os.getcwd(),'Retraining',filename)
    model_sections = pickle.load(open(filename, 'rb'))

filename = 'countMLP_Retrain'
    filename=os.path.join(os.getcwd(),'Retraining',filename)
    pickle_in = open(filename,"rb")
    counter_sections = pickle.load(pickle_in)
```

FIG. 13K

```
        except (OSError, IOError) as e.

if(flag2 == 1):
            if(doc_type=='1'):
                obj = get_exact_matches_Prot(csr_temp_sec,csr_temp_sec1, csr_temp_sec2,db,
study_id, study[0][3])
                csr_temp1 = getCSR_template(db, study_id)
                lis1=useradded(csr_temp1)
                lis2 = csr_toc
                fuzz_dic = fuzzratio01_new(lis1, csr_toc_prot, csr_toc_sap, 1)
                dict3 = {**obj, **fuzz_dic}
                return dict3
            elif(doc_type=='2'):
                obj=get_exact_matches_SAP(csr_temp_sec, csr_temp_sec2,db, study_id,
study[0][3])
                obj = get_dictionary_int(obj)
    except Exception as e:
        traceback.print_exc()
    return obj def predict_mapping_New(study_id,doc_type):
    try:
        db = make_db_connection()
        obj = get_mapping_New(db, study_id, 1, 1,doc_type)
        return jsonify(obj)
    except Exception as e:
        logger.error(e)
```

FIG. 13L

```
import pandas as pd
import tabula
import camelot
from camelot import utils
from numpy import asarray
from PIL import Image
from pdf2image import convert_from_path
import fitz
import tabula
import json
import pandas as pd
from detectron2.config import get_cfg
from detectron2.data import MetadataCatalog
from detectron2.engine.defaults import DefaultPredictor
from detectron2.config import get_cfg
from detectron2 import model_zoo
import cv2
import torch
import os
from detectron2.utils.visualizer import ColorMode, Visualizer
from services import make_db_connection,log_details
import random
import tempfile def extract_table_tabula(box, page, pdf):
    """"
    Extract table with box in relative coordinates, page an integer and pdf a path to pdf.
    Note: Tabula box is (y1=top, x1=left, y2=bottom, x2=right) in IMAGE coordinate system !
    """"
        box = (box[1]*100, box[0]*100 , box[3]*100, box[2]*100)

dfs = tabula.read_pdf(input_path = pdf, # path to pdf
            output_format=None, # dataframe or json
```

FIG. 14A

```
            encoding='utf-8', # pandas encoding in memory
            java_options=None, # java vm options
            pandas_options=None, # options related pandas package such as {'header':
None}
            multiple_tables=True, # more than one table
            user_agent=None,
            pages=page, # pages starting from 1 to analyze in pdf
            guess=False, # table detection, set to false if an area is specified
            area=box, # analyze(top,left,bottom,right). Default is entire page.
            relative_area=True, # use relative area coordinates
            lattice=False, # lattice algorithm uses cv to detect lines
            stream=False, # stream uses relative positioning to detect columns and rows
            password=None, # password encryption pdf
            silent=None, # remove warning stderr
            columns=None, # X coordinates of column boundaries such as [10.1, 20.2,
30.3]
            format=None, # "CSV", "TSV", "JSON" output format
            batch=None, # convert all pdfs in this directory
            output_path=None, # path to write results in specified format
            options='')
    df = dfs[0] if dfs else pd.DataFrame()
    df.dropna(axis=1, how="all", inplace=True)
    df.dropna(axis=0, how="all", inplace=True)
    return df def extract_table_camelot(box, page, pdf):
    """
    Extract table with box in relative coordinates, page an integer and pdf a path to pdf.
    Note: table_areas should be ["x1=left,x2=top,x3=right,x4=bottom", ...] in PDF coordinat
system !
    """
    layout, (w,h) = utils.get_page_layout(pdf)
    box = (box[0]*w, (1-box[1])*h, box[2]*w, (1-box[3])*h)
```

FIG. 14B

```
box = [",".join([str(round(b,2)) for b in box])]

page = str(page)

dfs = camelot.read_pdf(filepath=pdf,
            pages=page,
            flavor='lattice',
            layout_kwargs = {}, # dict pdfminer.layout.LAParams
            table_areas = box,
            )
df = dfs[0].df if len(dfs)>0 else pd.DataFrame()
df.dropna(axis=1, how="all", inplace=True)
df.dropna(axis=0, how="all", inplace=True)
return df def float_to_coordinate(rect, w, h):
    """ float to coordinate with some safety margin for text extraction """
    return [
        rect[0] * w - 5,
        rect[1] * h - 5,
        rect[2] * w + 5,
        rect[3] * h + 5
    ]

def extract_predictions(predictions, pdf, p, datasetName):
    """ util function to extract words with the DLA information"""

doc = fitz.open(pdf)
    page = doc[p-1]
    print("predicting for page:",page)
    fields = predictions["instances"].get_fields()
    height,width = predictions["instances"]._image_size
    res=[]
```

FIG. 14C

```
for i in range(len(fields["pred_boxes"])):
    bb = fields["pred_boxes"].tensor[i]
    score = fields["scores"][i]
    pred_class = fields["pred_classes"][i]
    typ = MetadataCatalog.get("my_dataset_train").thing_classes[pred_class] #give the dataset registred name
    box = [bb[0].item()/width, bb[1].item()/height,
        bb[2].item()/width, bb[3].item()/height]

rect = fitz.Rect(float_to_coordinate(box, page.MediaBox.width, page.MediaBox.height))
    text = page.get_textbox(rect)

field = {
        "type" : typ,
        "content": text,
        "page" : p,
        "box": box,
        "score": score.item()
    }
    if field["type"] == "figure":
        pass
    elif field["type"] == "TBNAME":
        field["content"]=text
    elif field["type"] == "text":
        if len(text) > 50:
            field["content"] = text
    elif field["type"] == "title":
        field["content"] = text
    elif field["type"] == "list":
        field["content"] = text
    else:
        pass
```

FIG. 14D

```
    res.append(field)
  return res def setup_custom(roi_threshold = 0.5):
  num_of_classes= 1
  cfg = get_cfg()
  cfg.merge_from_file(model_zoo.get_config_file("COCO-
Detection/faster_rcnn_R_101_FPN_3x.yaml"))
  opts = ["MODEL.WEIGHTS", "./model/model_final_cus.pth", "MODEL.DEVICE" ,
"cpu" ]
  cfg.merge_from_list(opts)
  cfg.MODEL.ROI_HEADS.NUM_CLASSES = num_of_classes
  cfg.MODEL.ROI_HEADS.SCORE_THRESH_TEST = roi_threshold
  MetadataCatalog.get("my_dataset_train").thing_classes = ['TBNAME']
  cfg.freeze()
  predictor = DefaultPredictor(cfg)
  return predictor def save_images_as_pdf(images, path):
  im1 = images[0]
  im1.save(path,save_all=True, append_images=images[1:])

def save_dla(fields, images, name, output_dir):
  if not os.path.exists(output_dir):
    os.makedirs(output_dir)
  save_images_as_pdf(images = images, path = output_dir + "/" + name + ".pdf")
  with open(output_dir + "/" + name + ".txt", 'w+') as f:
    json.dump(fields, f)

def run_on_image(image,predictor):
  vis_output = None
  predictions = predictor(image)
  cfg = predictor.cfg
```

FIG. 14E

```
    metadata = MetadataCatalog.get(cfg.DATASETS.TEST[0] if len(cfg.DATASETS.TEST)
else "__unused")
        instances = predictions["instances"].to(torch.device("cpu"))
        visualizer = Visualizer(image, metadata, instance_mode=ColorMode.IMAGE)
        vis_output = visualizer.draw_instance_predictions(predictions=instances)
        return predictions, vis_output def predict(in_path):
    img = read_image(in_path, format="BGR")
    return predict_from_numpy(img)

def predict_from_numpy(in_numpy,predictor):
    predictions, visualized_output = run_on_image(in_numpy,predictor)
    return predictions, visualized_output def extract_pdf(pdf):
    tmp=os.path.join(os.getcwd(),'Source_Docs')
    with tempfile.TemporaryDirectory() as path:
        images_from_path = convert_from_path(pdf, output_folder=tmp,fmt='jpeg')
    pages = convert_from_path(pdf)
    predictor=setup_custom()
    datasetName='my_dataset_train'
    fields, images = [],[]
    for i,page in enumerate(pages):
        predictions, visualization = predict_from_numpy(asarray(page),predictor)
        fiel = extract_predictions(predictions, pdf, i+1,datasetName)
        fields.extend(fiel)
    return fields def GetFields(pdf,flag):
    pages = convert_from_path(pdf)
    fields = extract_pdf(pdf)
    return fields
```

FIG. 14F

```
def GetTableNamesCustom_old(fields):
    lis=[]
    t1=[]
    final_lis=[]
    for i in fields:
        if('type' in i.keys()):
            if(i['type']=='TBNAME' and 'content' in i.keys()):
                val=(len(i['content'].split('\n')))
                if(val<=4 and i['box'][3]<0.16):
                    lis.append(i['content'])
                    t1.append(i['page'])
                final_lis=lis
                final_page=t1
                final_merge=merge(final_page,final_lis)
    return final_merge def GetTableNamesCustom(fields):
    lis=[]
    t1=[]
    final_lis=[]
    for i in fields:
        if('type' in i.keys()):
            if(i['type']=='TBNAME' and 'content' in i.keys()):
                val=(len(i['content'].split('\n')))
                if(val<=4 and i['score']>0.85):
                    lis.append(i['content'])
                    t1.append(i['page'])
                final_lis=lis
                final_page=t1
                final_merge=merge(final_page,final_lis)
    return final_merge def merge(t1, t2):
```

FIG. 14G

```
    merged_list = [(p1, p2) for idx1, p1 in enumerate(t1)
    for idx2, p2 in enumerate(t2) if idx1 == idx2]
    return merged_list def GetTableNames(study_id):
    final_lis=[]
    db = make_db_connection()
    cursor = db.cursor()
    cursor.execute("select PDF_CONTENT from csr_source_files where Type like '%Intext%'
and study_id="+study_id)
    blobs = cursor.fetchall()
    cnt=0
    for ablob in blobs:
        cnt+=1
        cust_lis=[]
        if(ablob):
            filename="Output_intext"+str(study_id)+str(cnt)+"_"+".pdf"
            filename=os.path.join(os.getcwd(),'Source_Docs',filename)
            with open(filename, "wb") as output_file:
                output_file.write(ablob[0])
                fields_cust=GetFields(filename,1)
                cust_lis=GetTableNamesCustom(fields_cust)
                final_lis.extend(cust_lis)
    return final_lis
```

FIG. 14H

```java
public Response<String> saveKeyword(CSRSourceFileSectionDTO sourceFileSectionDTO,
long studyTemplateId, String appendFlag) throws Exception {
    Response<String> response = new Response<>();
    CSRSourceFilesDTO csrSourceFilesDTO = csrSourceFileService
            .getCSRSourceFileOfType(sourceFileSectionDTO.getType(),
sourceFileSectionDTO.getStudyId());
    StudyTemplateDTO studyTemplateDTO =
studyTemplateService.getStudyTemplateById(studyTemplateId);
    UserDTO user = (UserDTO)
SecurityContextHolder.getContext().getAuthentication().getPrincipal();

if (sourceFileSectionDTO.getId() != 0) { sourceFileSectionDTO = csrSourceFileSectionsService
                .getSourceFileSectionsOfStudy(sourceFileSectionDTO.getId());
        byte[] docxContent;
        if (sourceFileSectionDTO.getContent() == null) {
            docxContent = getDocxContentForKeword(sourceFileSectionDTO.getHeading(),
                    sourceFileSectionDTO.getEndText(), csrSourceFilesDTO.getDocxContent());
        } else {
            // Intext table will be saved in sourceFileSectionDTO table
            docxContent = sourceFileSectionDTO.getContent();
        }
        XWPFDocument xwpfDocument1 = new XWPFDocument(new
ByteArrayInputStream(docxContent));
        if(!sourceFileSectionDTO.getType().equalsIgnoreCase("Intext"))
        WordUtil.copyNumbering(new XWPFDocument(new
ByteArrayInputStream(csrSourceFilesDTO.getDocxContent())),xwpfDocument1);
        ByteArrayOutputStream buffer1 = new ByteArrayOutputStream();
        xwpfDocument1.write(buffer1);

byte[] bytes;
        Map<String, String> settingsMap = this.settingsForFont();
```

FIG. 15A

```
        ByteArrayOutputStream buffer = new ByteArrayOutputStream();
        if (!appendFlag.isEmpty() && studyTemplateDTO.getDocxContent() != null &&
appendFlag.equalsIgnoreCase("APPEND")) {

CustomXWPFDocument existDocx =
appendDocxWithExistContentWithNumbering(
                studyTemplateDTO.getDocxContent(), buffer1.toByteArray(), settingsMap);

WordUtil.updateImageData(new XWPFDocument(new
ByteArrayInputStream(docxContent)),existDocx);

existDocx.write(buffer);
        bytes = buffer.toByteArray();

//Fetch source file reference when section have multiple source
        String csrSourceFileSectionIDs[] =
(studyTemplateDTO.getSourceFileSectionRef()) != null ?
studyTemplateDTO.getSourceFileSectionRef().split(",") : null;
            List<String> sectionNum = new ArrayList<>();
            if (csrSourceFileSectionIDs != null && csrSourceFileSectionIDs.length > 1) {
                for (String id : csrSourceFileSectionIDs) {
                    sectionNum.add(id);
                }
                if(studyTemplateDTO.getCsrSourceFileSectionDTO()!=null)
                sectionNum.add(String.valueOf(sourceFileSectionDTO.getId()));
                studyTemplateDTO.setSourceFileSectionRef(String.join(",", sectionNum));
            } else {
                //when replace remove reference which is mapped before
                if(studyTemplateDTO.getCsrSourceFileSectionDTO()!=null)
```

FIG. 15B

```
sectionNum.add(String.valueOf(studyTemplateDTO.getCsrSourceFileSectionDTO().getId())
);
                sectionNum.add(String.valueOf(sourceFileSectionDTO.getId()));
                studyTemplateDTO.setSourceFileSectionRef(String.join(",", sectionNum));
            }
            auditTrailService.auditTrailLogCreation("Section
"+studyTemplateDTO.getCsrSectionNum()+" Appended Using Find and
Retrieve",user,sourceFileSectionDTO.getStudyId());
        } else {
            bytes = buffer1.toByteArray();
            studyTemplateDTO.setSourceFileSectionRef(null);
            studyTemplateDTO.setCsrSourceFileSectionDTO(sourceFileSectionDTO);
            //Remove mapping from section keyword table
            List<CsrStudyTemplateSectionKeyword> studyTemplateSectionKeywordList =
studyTemplateSectionKeywordDAO.findAllKeywordMappedForTheParticularSection(study
TemplateId, studyTemplateDTO.getStudyId().getId());
            if (studyTemplateSectionKeywordList != null)

studyTemplateSectionKeywordDAO.deleteAll(studyTemplateSectionKeywordList);
            auditTrailService.auditTrailLogCreation("Section
"+studyTemplateDTO.getCsrSectionNum()+" Replaced Using Find and
Retrieve",user,sourceFileSectionDTO.getStudyId());
        }
        studyTemplateDTO.setDocxContent(bytes);
        studyTemplateDTO.setCsrSourceFileSectionDTO(sourceFileSectionDTO);
        studyTemplateDTO.setKeywordInput(true);
        studyTemplateDTO.setEdited(true);
        studyTemplateService.updateStudyTemplateRecord(studyTemplateDTO);

csrStudyDAO.setChanged(studyTemplateDTO.getStudyId().getId(), true);

response.setMessage("Text added Successfully");
        response.setStatus(HttpStatus.OK.value());
```

FIG. 15C

```
    } else {
        if (csrSourceFilesDTO == null) {
            throw new ResponseStatusException(HttpStatus.NOT_FOUND, "Source file not uploaded", null);
        }
        csrSourceFileService.saveDynamicSectionAsDocx(csrSourceFilesDTO,
sourceFileSectionDTO.getHeading(),
            studyTemplateDTO);
    }
    return response;

ARTIFICIAL INTELLIGENCE-ENABLED SYSTEM AND METHOD FOR AUTHORING A SCIENTIFIC DOCUMENT

BACKGROUND

Scientific documents such as clinical study reports (CSRs) are lengthy and manually written or typed documents that describe clinical trial methods and results. These scientific documents are comprehensive documents comprising a substantial amount of information collected from multiple source documents such as protocol, a statistical analysis plan, a case report form, safety narratives, in-text tables, post-text tables, and tables, listings, and figures (TLFs). For example, the CSR is similar to a peer-reviewed manuscript comprising an introduction, a background, summary sections, appendices, experimental methods, descriptions of study subjects, efficacy results, safety results, conclusions, etc. The CSR describes endpoints of a clinical study or outcomes being researched, provides detailed information on how data was collected and analyzed, and confirms whether the endpoints were met or outcomes were achieved. The CSR helps regulatory agencies determine whether a potential new medication is safe and effective.

Authoring scientific documents such as clinical study reports (CSRs) is time consuming and requires substantial manual effort. Writers, for example, medical writers, typically spend days, weeks, and even months to prepare CSRs. The writers typically copy and paste content from other sources to relevant sections of a CSR template and spend a substantial amount of time writing safety narratives and interpretations of study results from the tables, listings, and figures (TLFs). Moreover, editing or correcting these lengthy scientific documents, identifying and incorporating missing information therewithin, implementing efficient co-authoring, correcting grammar, and maintaining consistency of language and grammar throughout these scientific documents, while adhering to guidelines defined by regulatory authorities, are substantially difficult, time consuming, and subject to several errors, thereby affecting quality of these scientific documents. Furthermore, incorporating and interpreting objects such as tables, listings, figures, etc., in these scientific documents add to the extensive manual efforts that need to be taken by writers.

Hence, there is a long-felt need for an artificial intelligence (AI)-enabled system and method for automatically authoring a scientific document, for example, a clinical study report, using a machine learning model and natural language processing with minimal user intervention, while addressing the above-recited problems associated with the related art.

SUMMARY OF THE INVENTION

This summary is provided to introduce a selection of concepts in a simplified form that are further disclosed in the detailed description of the invention. This summary is not intended to determine the scope of the claimed subject matter.

The artificial intelligence (AI)-enabled system and method disclosed herein address the above-recited need for automatically authoring a scientific document, for example, a clinical study report (CSR), using a machine learning (ML) model and natural language processing (NLP) with minimal user intervention. The AI-enabled system uses AI techniques to extract content from source documents and automatically author or write the scientific document. The AI-enabled system reads from unstructured source documents and summarizes the content into another document, that is, the automatically generated scientific document. The AI-enabled system reduces manual efforts and time consumed in preparing CSRs and other scientific documents substantially, thereby allowing users to focus more on discussion points and interpretations. The AI-enabled system accelerates authoring of scientific documents using ML and NLP comprising natural language generation (NLG) and natural language understanding (NLU).

The AI-enabled system and the method disclosed herein employ an automated authoring engine defining computer program instructions executable by at least one processor for automatically authoring a scientific document, for example, a clinical study report (CSR), using a machine learning model and natural language processing with minimal user intervention. The automated authoring engine configures a scientific document template comprising multiple sections based on scientific document requirements. The sections of the scientific document template comprise fixed sections and user-configurable sub-sections. One or more of the sections are configured as feedback to retrain the machine learning model. In an embodiment, the scientific document requirements based on which the scientific document template is configured comprise regulatory authority guidelines, for example, the International Council for Harmonisation of Technical Requirements for Pharmaceuticals for Human Use (ICH) E3 guidelines defined by the ICH. The automated authoring engine receives and stores multiple source documents in a source database. The source documents comprise, for example, a protocol document, a statistical analysis plan document, a case report form, safety narratives, in-text tables, post-text tables, summary reports, tables, listings, and figures (TLFs), etc. The automated authoring engine automatically extracts and pre-processes content from the source documents using natural language processing. The automated authoring engine maps the sections configured in the scientific document template with the content from the source documents by executing a section mapping algorithm. The mapping comprises matching the sections of the scientific document template with sections extracted from the source documents, and predicting appropriate sections from among the sections in the scientific document template for rendering the content from the source documents based on the matching using the machine learning model and historical scientific document information acquired from users. The automated authoring engine matches the sections defined in the scientific document template with target fields using section mapping. The automated authoring engine automatically generates the scientific document by rendering the content from the source documents into the predicted sections of the scientific document template. In an embodiment, the automated authoring engine generates and renders a preview of the automatically generated scientific document on a preview screen of a user interface for subsequent editing and automatic regeneration of the scientific document.

The automated authoring engine executes one or more of multiple content editing functions on the automatically generated scientific document using natural language processing. In an embodiment of executing one of the content editing functions, the automated authoring engine automatically converts tenses of the content in the automatically generated scientific document based on user preferences by executing a natural language generation (NLG) algorithm. In another embodiment of executing another one of the content editing functions, the automated authoring engine highlights data fields in the automatically generated scientific document that require attention and editing from a user. In another embodiment of executing another one of the content editing functions, the automated authoring engine executes post-text to in-text conversion.

In an embodiment, the automated authoring engine interprets in-text tables from the source documents and generates an in-text table summary by executing a natural language understanding (NLU) algorithm. In another embodiment, in response to a user input, for example, a keyword, the automated authoring engine fetches and displays additional information from the source documents for selection and rendering into one or more of the sections in the scientific document template. In an embodiment, the automated authoring engine configures the user input as additional feedback to retrain the machine learning model.

In an embodiment, the automated authoring engine provides selective access of an entirety of the automatically generated scientific document to one or more co-authors of the automatically generated scientific document for performing one or more actions on the automatically generated scientific document. In another embodiment, the automated authoring engine provides selective access of one or more sections of the automatically generated scientific document to one or more co-authors of the automatically generated scientific document for performing one or more actions on the automatically generated scientific document.

In an embodiment, the automated authoring engine generates and renders one or more of multiple reports comprising, for example, a traceability report, an audit report, and a version history report. The traceability report is configured to display the mapping of the sections with the source documents containing the rendered content. The audit report is configured to record and display actions performed on the automatically generated scientific document. The version history report is configured to display versions of the automatically generated scientific document.

In one or more embodiments, related systems comprise circuitry and/or programming for executing the methods disclosed herein. The circuitry and/or programming comprise any one or any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or that component shown by that same numeral in any subsequent drawing herein.

FIGS. 12A-12B exemplarily illustrate a pseudocode of the automated authoring engine defining computer program instructions executable by at least one processor for automatically authoring a scientific document using a machine learning model and natural language processing with minimal user intervention.

FIGS. 13A-13L exemplarily illustrate a computer program code of section mapper executable by the processor(s) for mapping the sections configured in the scientific document template with the content from the source documents.

FIGS. 14A-14H exemplarily illustrate a computer program code of in-text table interpreter executable by the processor(s) for interpreting in-text tables from the source documents.

FIGS. 15A-15D exemplarily illustrate a computer program code of a find and retrieve engine executable by the processor(s) for fetching and displaying, in response to a user input, additional information from the source documents for selection and rendering into one or more of the sections in the scientific document template.

DETAILED DESCRIPTION OF THE INVENTION

Various aspects of the disclosure herein are embodied as a system, a method, or a non-transitory, computer-readable storage medium having one or more computer-readable program codes stored thereon. Accordingly, various embodiments of the disclosure herein take the form of an entirely hardware embodiment, an entirely software embodiment comprising, for example, microcode, firmware, software, etc., or an embodiment combining software and hardware aspects that are referred to herein as a "system", a "module", an "engine", a "circuit", or a "unit".

Figure 1:
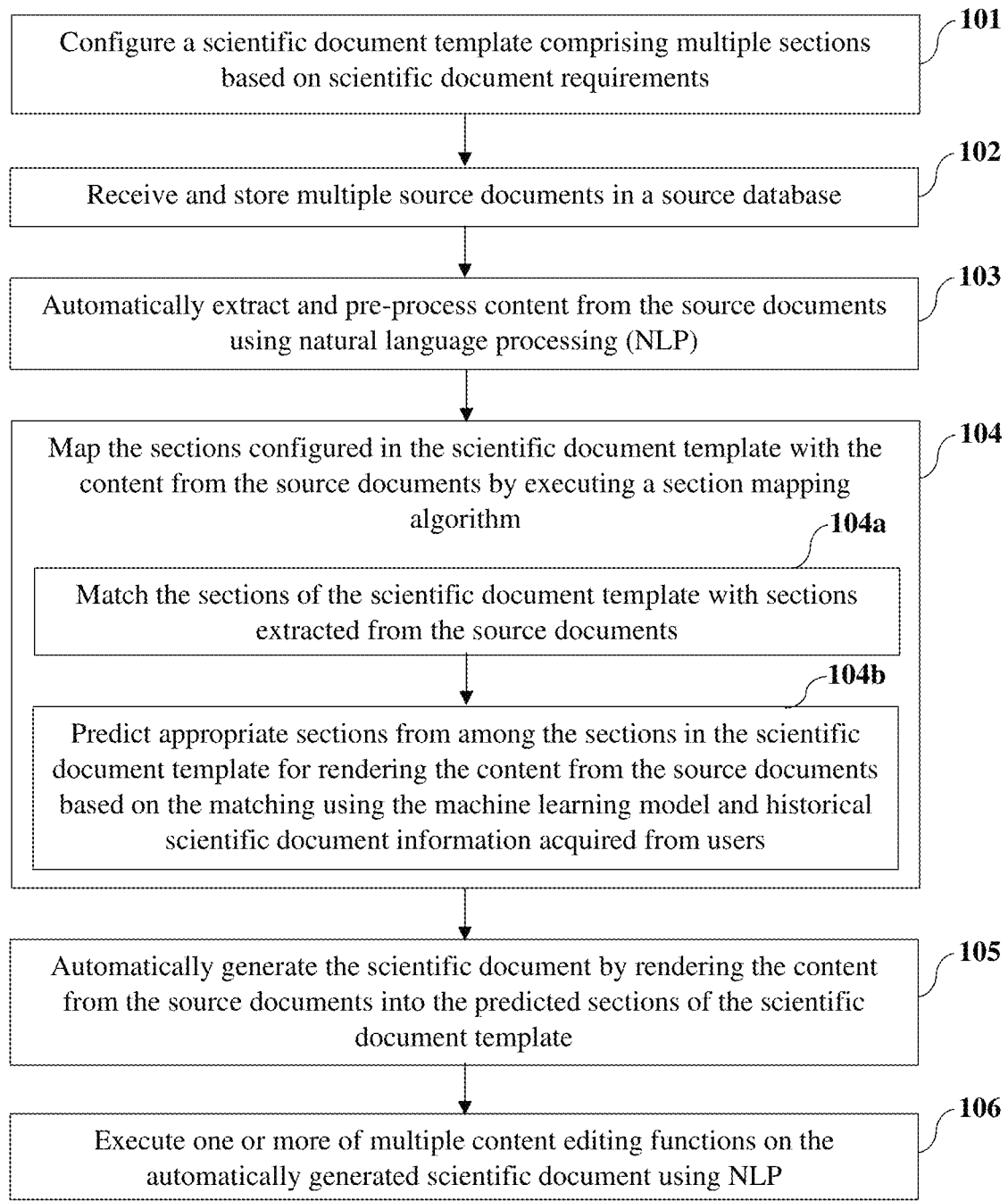
FIG. 1 illustrates a flowchart of an embodiment of a method for automatically authoring a scientific document using a machine learning model and natural language processing with minimal user intervention.

FIG. 1 illustrates a flowchart of an embodiment of a method for automatically authoring a scientific document, for example, a clinical study report (CSR), using a machine learning (ML) model and natural language processing (NLP) with minimal user intervention. For purposes of illustration, the disclosure herein refers to a clinical study report being automatically authored using an ML model and NLP; however, the scope of the artificial intelligence (AI)-enabled system and method disclosed herein is not limited to automatically authoring a clinical study report, but extends to include automatic authoring of any lengthy, scientific or other document comprising multiple sections and objects such as tables, listings, figures, etc., that typically requires substantial manual effort and time to be written or typed.

The method disclosed herein employs an automated authoring engine defining computer program instructions executable by at least one processor for automatically authoring a scientific document using a machine learning model and natural language processing with minimal user intervention. The automated authoring engine configures 101 a scientific document template comprising multiple sections based on scientific document requirements. The sections of the scientific document template comprise fixed sections and user-configurable sub-sections. One or more of the sections are configured as feedback to retrain the machine learning model. In an embodiment, the scientific document requirements based on which the scientific document template is configured comprise regulatory authority guidelines, for example, the International Council for Harmonisation of Technical Requirements for Pharmaceuticals for Human Use (ICH) E3 guidelines defined by the ICH. In an embodiment, the automated authoring engine is configured with a predefined template, for example, a predefined clinical study report (CSR) template, generated in accordance with the ICH E3 guidelines. The ICH E3 guidelines describe the format and content of a CSR that complies with regulatory authorities of ICH regions.

The predefined clinical study report (CSR) template comprises fixed main sections, for example, a title page, a study synopsis, a table of contents, a list of abbreviations and definition of terms, ethics and regulatory approval, study objectives, etc., and fixed sub-sections, for example, primary objective, secondary objective, etc., that are mandatory. The predefined CSR template further comprises sub-sections that can be added, edited, and deleted based on clinical study requirements. A user, for example, a medical writer, may add a sub-section such as exploratory objective under the main section labeled as "study objectives" in the predefined CSR template. In an embodiment, the automated authoring engine allows dragging and realignment of the sub-sections on a user interface rendered by the automated authoring engine. The automated authoring engine allows user-configurable sub-sections to be realigned based on user preferences. In an embodiment, the automated authoring engine configures a generalized template. In another embodiment, the automated authoring engine configures a template specific to scientific document requirements. In another embodiment, the automated authoring engine configures a template in accordance with requirements of a sponsor of a clinical trial. The automated authoring engine processes user configurations of the sub-sections of the scientific document template as feedback to retrain the machine learning model. The machine learning model herein is trained to learn clinical and other study-based information with minimal user intervention, improve results, and mappings continuously on subsequent clinical studies.

The automated authoring engine receives and stores 102 multiple source documents in a source database. The source documents comprise, for example, a protocol document, a statistical analysis plan (SAP) document, a case report form (CRF), safety narratives, in-text tables, post-text tables, in-text reports, summary reports, tables, listings, and figures (TLFs), etc. The protocol document is a document describing the method of conducting a clinical trial comprising, for example, background, rationale, objectives, design, methodology, statistical considerations, organization of the clinical trial, etc. The SAP document is a technical document describing a planned statistical analysis of a clinical trial as outlined in the protocol document. The CRF is a document used for collecting data of patients participating in a clinical trial. The safety narratives summarize clinically relevant, chronological information of a progression of an event experienced during the course of a clinical trial or immediately after the clinical trial. In-text tables are configured to be copied into a scientific document, while post-text tables are configured to be appended to the scientific document. In-text reports and summary reports are used for summarizing various aspects of the clinical trial. The TLFs are used for representing and publishing results of the clinical trial in a readable format. In an embodiment, the automated authoring engine allows users to upload one or more source documents into the source database via a user interface, for example, a graphical user interface (GUI) rendered by the automated authoring engine.

Figure 4:
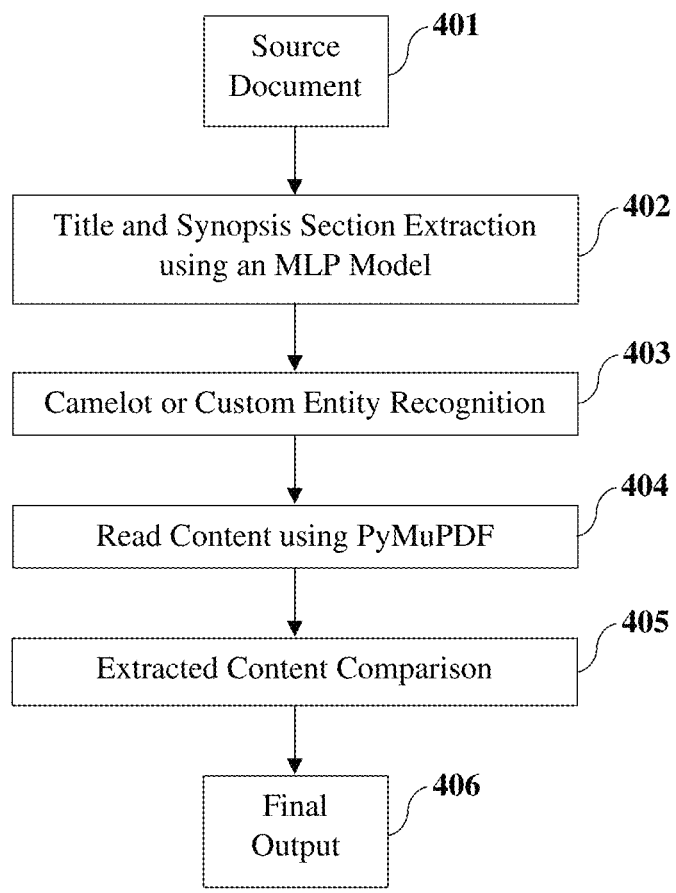
FIG. 4 exemplarily illustrates a flowchart of an embodiment of a natural language processing algorithm executed for automatically extracting and pre-processing content from a source document.

The automated authoring engine automatically extracts and pre-processes 103 content from the source documents using natural language processing as disclosed in the description of FIG. 4. In an embodiment, the automated authoring engine automatically extracts and pre-processes content from the source documents prior to machine language modelling. The automated authoring engine maps 104 the sections configured in the scientific document template with the content from the source documents by executing a section mapping algorithm as disclosed in the description of FIG. 5. Section mapping refers to reading from a source document and extracting content to a relevant section of the scientific document template. Sections in a source document, for example, a protocol document, may be different from the sections configured in the scientific document template. For example, while the name of section 7 in the predefined clinical study report (CSR) template is "Introduction", the name of section 7 in the source document may be any other variant section name such as introduction, background, study rationale, objectives, etc. The automated authoring engine trains the machine learning model with multiple variant section names for mapping the sections of the source document to the relevant sections in the scientific document template. The mapping comprises matching 104a the sections of the scientific document template with sections extracted from the source documents. The automated authoring engine comprises a section extractor configured to extract the sections and the content from the source documents and store the sections and the content in a section repository. The section extractor provides the user-configurable sub-sections, also referred to as "user-defined sub-sections", as feedback for retraining the machine learning model. In an embodiment, the section extractor extracts the sections from the source documents as target fields using a table of contents (TOC) contained in one or more of the source documents. In an embodiment, the section extractor refers the TOC from various source documents as keywords for section mapping to generate the scientific document with expected content. The section extractor compares the extracted sections with the sections configured in the scientific document template to identify matches and perform section mapping as disclosed in the description of FIG. 5.

The mapping further comprises predicting 104b appropriate sections from among the sections in the scientific document template for rendering the content from the source documents based on the matching using the machine learning model and historical scientific document information acquired from users. The automated authoring engine trains the machine learning model to recognize which type of content belongs in which section of the scientific document template. The machine learning model predicts the appropriate sections based on the section mapping as disclosed in the description of FIG. 5, and based on information acquired from users on previous clinical studies.

In an embodiment, the machine learning model is a custom multilayer perceptron (MLP) model that is pretrained with base data belonging to available source documents. In an embodiment, predictions of the MLP model with an accuracy of only above 80% are considered for section mapping. In an embodiment, if the MLP model fails to predict the appropriate sections, due to which a user attempts to find matching sections by providing a keyword, the automated authoring engine captures and appends that keyword to the existing training data for retraining the MLP model. In an embodiment, the automated authoring engine retrains the MLP model with new training data at a scheduled hour on a daily basis. The automated authoring engine employs the retrained model to generate further predictions and the next time the MLP model encounters the same failed input, the MLP model is equipped to generate predictions above the specified accuracy. The automated authoring engine automatically generates 105 the scientific document by rendering the content from the source documents into the predicted sections of the scientific document template. In an embodiment, the automated authoring engine generates and renders a preview of the automatically generated scientific document on a preview screen of a user interface as exemplarily illustrated in FIG. 10S, for subsequent editing and automatic regeneration of the scientific document.

The automated authoring engine executes 106 one or more of multiple content editing functions on the automatically generated scientific document using natural language processing. In an embodiment of executing one of the content editing functions, the automated authoring engine automatically converts tenses of the content in the automatically generated scientific document based on user preferences by executing a natural language generation algorithm as disclosed in the description of FIG. 6. In another embodiment of executing one of the content editing functions, the automated authoring engine highlights data fields in the automatically generated scientific document that require attention and editing from a user as exemplarily illustrated in FIG. 10L.

In another embodiment of executing one of the content editing functions, the automated authoring engine executes post-text to in-text conversion. Post-text refers, for example, to statistical outputs that are appended to a document. In-text refers, for example, to statistical outputs that are copied and pasted into the body of another document. In an exemplary implementation of post-text to in-text conversion, the automated authoring engine allows a user to upload one or more source documents comprising tables in one or more formats, for example, a portable document format (PDF), a Microsoft® Word® docx format, a rich text format (RTF), etc., via an upload source document tab rendered by the automated authoring engine on a user interface. The automated authoring engine is configured to upload a single source document or multiple source documents comprising the tables. In an embodiment, the automated authoring engine uploads the tables and automatically generates a table of contents (TOC) from the uploaded source documents, that is, the post-text tables documents. The automated authoring engine allows the user to construct an in-text TOC from the TOC generated for the post-text tables documents, for example, using a drag and drop mechanism. The automated authoring engine displays the selected post-text tables to be converted into one or more in-text tables on the user interface. The automated authoring engine allows a user to select a list of tables needed for in-text table generation. In an embodiment, the automated authoring engine provides an option on the user interface to allow the user to realign the order of the tables. For example, the user may realign the order of the tables in the right-side of the user interface by performing a dragging action.

In an embodiment, the automated authoring engine renders a build in-text table tab on the user interface for configuring the post-text tables into an in-text format. The automated authoring engine allows the user to build and finalize the format of the in-text table(s) on the user interface. For example, the automated authoring engine allows the user to configure the font type, the font size, edit title, edit foot notes, delete table rows and/or columns, etc., at the build in-text table tab on the user interface. In an embodiment, the automated authoring engine renders a left-side screen and a right-side screen on the user interface, where the left-side screen displays the post-text tables from the source documents and the right-side screen displays the expected output in-text format. Furthermore, in an embodiment, the automated authoring engine renders a final in-text table tab on the user interface for displaying the output of the in-text table(s) converted from the post-text tables. The automated authoring engine allows the user to view the complete list of tables in the final in-text table tab. In an embodiment, the automated authoring engine renders the finalized in-text table(s) for download, for example, as separate tables or as a consolidated document with all the tables. In another embodiment, the automated authoring engine renders the finalized in-text table(s) for import into an upload screen of the user interface.

Figure 7:
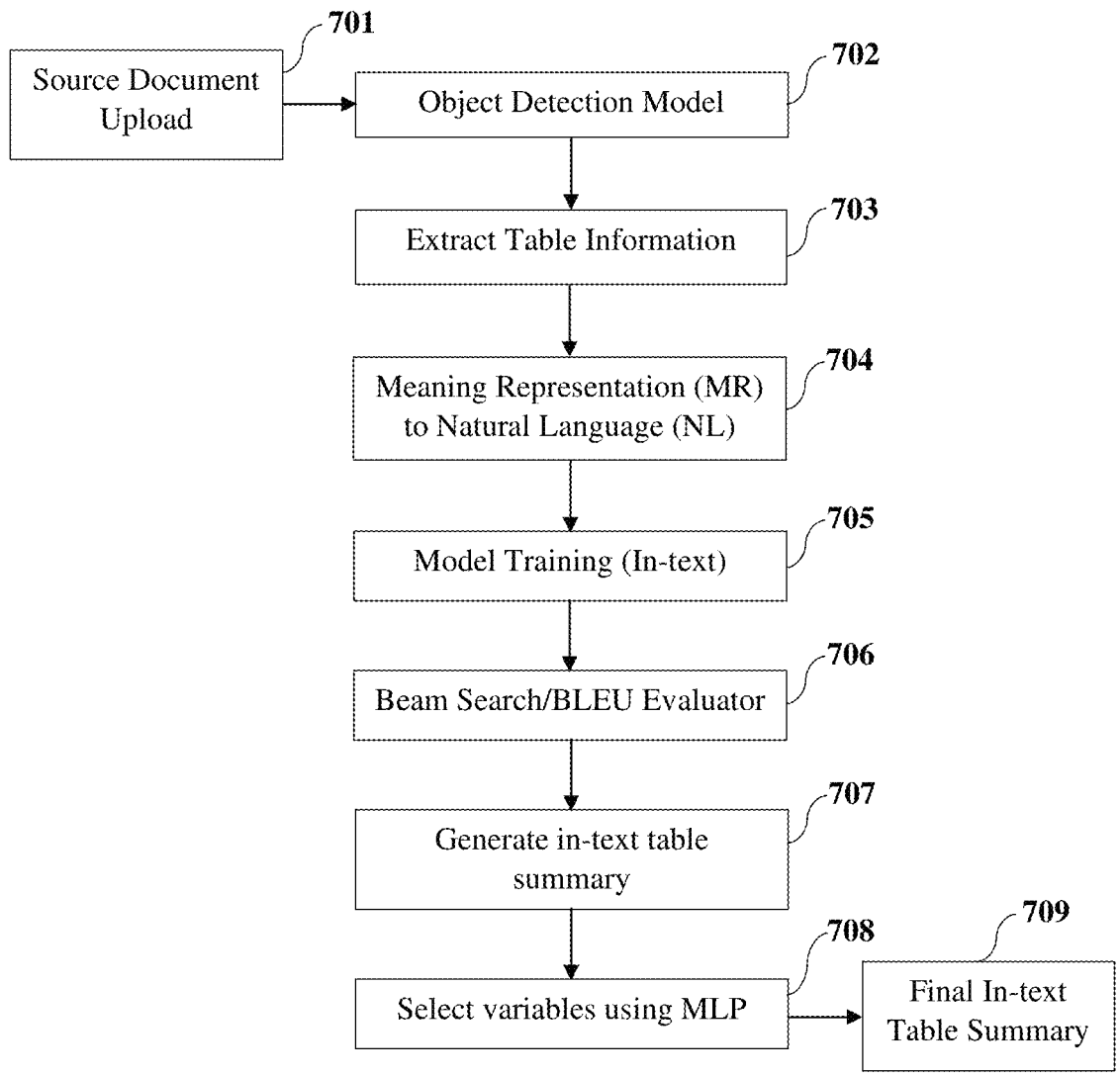
FIG. 7 exemplarily illustrates a flowchart of an embodiment of a natural language understanding algorithm executed for interpreting in-text tables from source documents and generating an in-text table summary.

In an embodiment, the automated authoring engine performs table structure recognition and summary generation using advanced object detection models for in-texts as disclosed in the description of FIG. 7. In an embodiment, the automated authoring engine interprets in-text tables from the source documents and generates an in-text table summary by executing a natural language understanding (NLU) algorithm as disclosed in the description of FIG. 7. In another embodiment, in response to a user input, for example, a keyword, the automated authoring engine fetches and displays additional information from the source documents for selection and rendering into one or more of the sections in the scientific document template as disclosed in the descriptions of FIGS. 10E-10J. In an embodiment, the automated authoring engine configures the user input as additional feedback to retrain the machine learning model. In another embodiment, the automated authoring engine performs section summarization and implements abstractive summary generation to generate meaningful summaries for synopsis fields, for example, methodology, statistical analysis, etc. The automated authoring engine applies pretrained models, for example, T5 and Bidirectional Encoder Representations from Transformers (BERT) summarization models to generate the summaries. The T5 model is a text-to-text transfer transformer model trained in an end-to-end manner with text as input and modified text as output. The BERT model outputs a class label or a span of the input to the input sentence. The BERT model is bidirectionally trained to have a deeper sense of language context and flow than single-direction language models. The BERT model utilizes an attention mechanism, for example, a transformer, that learns contextual relations between words or sub-words in a text. The automated authoring engine learns to generate the summaries based on hyperparameters set to extract key sentences for summarization without changing the content of the source documents.

In an embodiment, the automated authoring engine allows section-wise editing of the automatically generated scientific document by co-authors. There can be more than one author for the same scientific document. For example, when a particular section such as a safety narrative section for a clinical study needs to be written by another author, then the automated authoring engine allows the primary author to assign that particular section to that co-author. The automated authoring engine allows multiple co-authors to work simultaneously on different sections of the same scientific document as assigned by the primary author. In an embodiment, the automated authoring engine allows the co-author(s) to edit only the section assigned by the primary author and not any other section of the scientific document. In an embodiment, the automated authoring engine provides selective access of an entirety of the automatically generated scientific document to one or more co-authors of the automatically generated scientific document for performing one or more actions on the automatically generated scientific document. In another embodiment, the automated authoring engine provides selective access of one or more sections of the automatically generated scientific document to one or more co-authors of the automatically generated scientific document for performing one or more actions on the automatically generated scientific document. The automated authoring engine transmits the automatically generated scientific document to one or more co-authors electronically, for example, via a hyperlink provided in an electronic mail (email), a short message service (SMS) message, an instant message (IM), a direct message (DM), etc., and allows the co-authors to login and access the entire automatically generated scientific document or one or more sections of the automatically generated scientific document for review, selective editing, commenting, etc. The automated authoring engine then allows the co-authors to save and transmit the updated scientific document to the primary author electronically, for example, via a hyperlink provided in an email, an SMS message, an IM, a DM, etc.

In an embodiment, the automated authoring engine generates and renders one or more of multiple reports comprising, for example, a traceability report, an audit report, and a version history report. The traceability report is configured to display the mapping of the sections with the source documents containing the rendered content as exemplarily illustrated in FIGS. 10T-10U. The audit report is configured to record and display actions performed on the automatically generated scientific document. The audit report lists the actions performed in the AI-enabled system in real time. The version history report is configured to display versions of the automatically generated scientific document as exemplarily illustrated in FIG. 10V.

Figure 2:
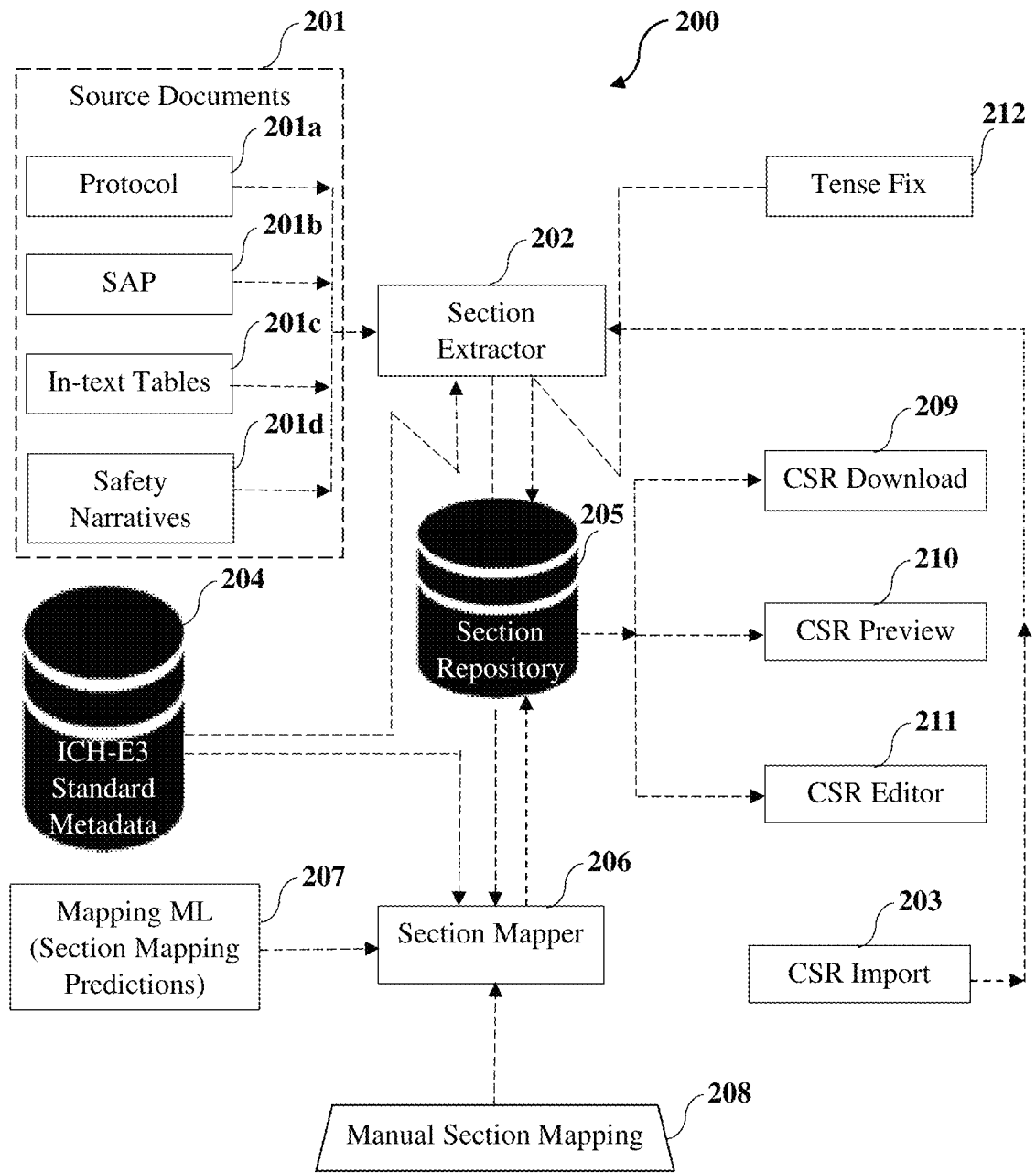
FIG. 2 exemplarily illustrates a high-level flow diagram of an embodiment of the method for automatically authoring a scientific document using a machine learning model and natural language processing with minimal user intervention.

FIG. 2 exemplarily illustrates a high-level flow diagram of an embodiment of the method for automatically authoring a scientific document using a machine learning model and natural language processing with minimal user intervention. Consider an example of automatically authoring a clinical study report (CSR) using the automated authoring engine of the artificial intelligence (AI)-enabled system 200 disclosed herein. The automated authoring engine automates the authoring of the CSR created by users, for example, medical writers, with the help of AI. In various embodiments, the automated authoring engine is implemented as an AI-featured, machine learning (ML) and natural language processing (NLP), natural language generation (NLG), and natural language understanding (NLU) engine configured to help the AI-enabled system 200 to learn clinical study-based information with minimal user intervention, improve results, and improve mappings continuously on subsequent clinical studies. The automated authoring engine comprises a metadata database 204, the section extractor 202, a section repository 205, and a section mapper 206 as exemplarily illustrated in FIG. 2. In this example, the metadata database 204 is configured to store standard metadata comprising regulatory authority guidelines, that is, the International Council for Harmonisation of Technical Requirements for Pharmaceuticals for Human Use (ICH) E3 guidelines defined by the ICH. The section extractor 202 is in operable communication with the metadata database 204 and the section repository 205. A user uploads multiple source documents 201, for example, protocol 201a, a statistical analysis plan (SAP) 201b, in-text tables 201c, and safety narratives 201d into the automated authoring engine via a user interface, for example, a graphical user interface (GUI) rendered by the automated authoring engine. The source documents 201 contribute a substantial amount of information to the CSR. The automated authoring engine automatically extracts and collates information from the source documents 201 in appropriate sections of a predefined CSR template as per ICH E3 guidelines for automatically generating the CSR. The automated authoring engine automates the efforts of medical writers expended in the CSR process.

In an embodiment, the automated authoring engine imports the predefined clinical study report (CSR) template via a CSR import 203 option provided in the AI-enabled system 200. The section extractor 202 receives the source documents 201 and the predefined CSR template as inputs, process the inputs in accordance with the ICH E3 metadata retrieved from the metadata database 204, and automatically extracts sections from the source documents 201 and the predefined CSR template for subsequent mapping by the section mapper 206. The section extractor 202 stores the extracted sections in the section repository 205. The section mapper 206 receives the ICH E3 metadata from the metadata database 204 and the extracted sections from the section repository 205 as inputs, and executes the section mapping algorithm for mapping the sections in the predefined CSR template with the content from the source documents 201 as disclosed in the description of FIG. 5. The section mapper 206 receives section mapping predictions 207 generated by the machine learning model and manual section mappings 208 acquired from users, for example, medical writers, for mapping the sections in the predefined CSR template with the content from the source documents 201. The section mapper 206 stores the section mappings in the section repository 205. In an embodiment, the section mapper 206 comprises a document generator configured to collate the content from the source documents 201 in appropriate sections of the predefined CSR template in accordance with the ICH E3 guidelines for automatically generating the CSR. In an embodiment, the automated authoring engine further comprises an in-text table interpreter for interpreting the in-text tables 201c in the natural English language using an AI technique and for generating an in-text table summary in the CSR as disclosed in the description of FIG. 7.

In an embodiment, the section mapper 206 stores the automatically generated CSR in the section repository 205 for subsequent CSR download 209, CSR preview 210, and CSR editing via a CSR editor 211 as exemplarily illustrated in FIG. 2. In an embodiment, the automated authoring engine executes a tense fix 212 by performing tense conversion using a natural language generation (NLG) technique in the generated CSR based on user preferences as disclosed in the description of FIG. 6. The NLG technique automatically and consistently converts the tenses in the generated CSR. The section mapper 206 generates a pre-filled CSR based on the section mapping predictions 207. The automated authoring engine allows the user to view the complete CSR in a preview screen indicated by CSR preview 210 on the GUI. The automated authoring engine allows the user to download the complete CSR via a CSR download 209 option rendered on the GUI. The CSR editor 211 allows the user to edit the CSR. The automated authoring engine saves all the edits and changes made in the CSR in the AI-enabled system 200. The CSR editor 211 also allows execution of one or more content editing functions on the CSR as disclosed in the description of FIG. 1. In an embodiment, the automated authoring engine allows the user to download and edit the CSR on a computing device and upload the edited CSR back into the AI-enabled system 200.

FIGS. 12A-12B exemplarily illustrate a pseudocode of the automated authoring engine defining computer program instructions executable by at least one processor for automatically authoring a scientific document using a machine learning model and natural language processing with minimal user intervention.

Figure 3:
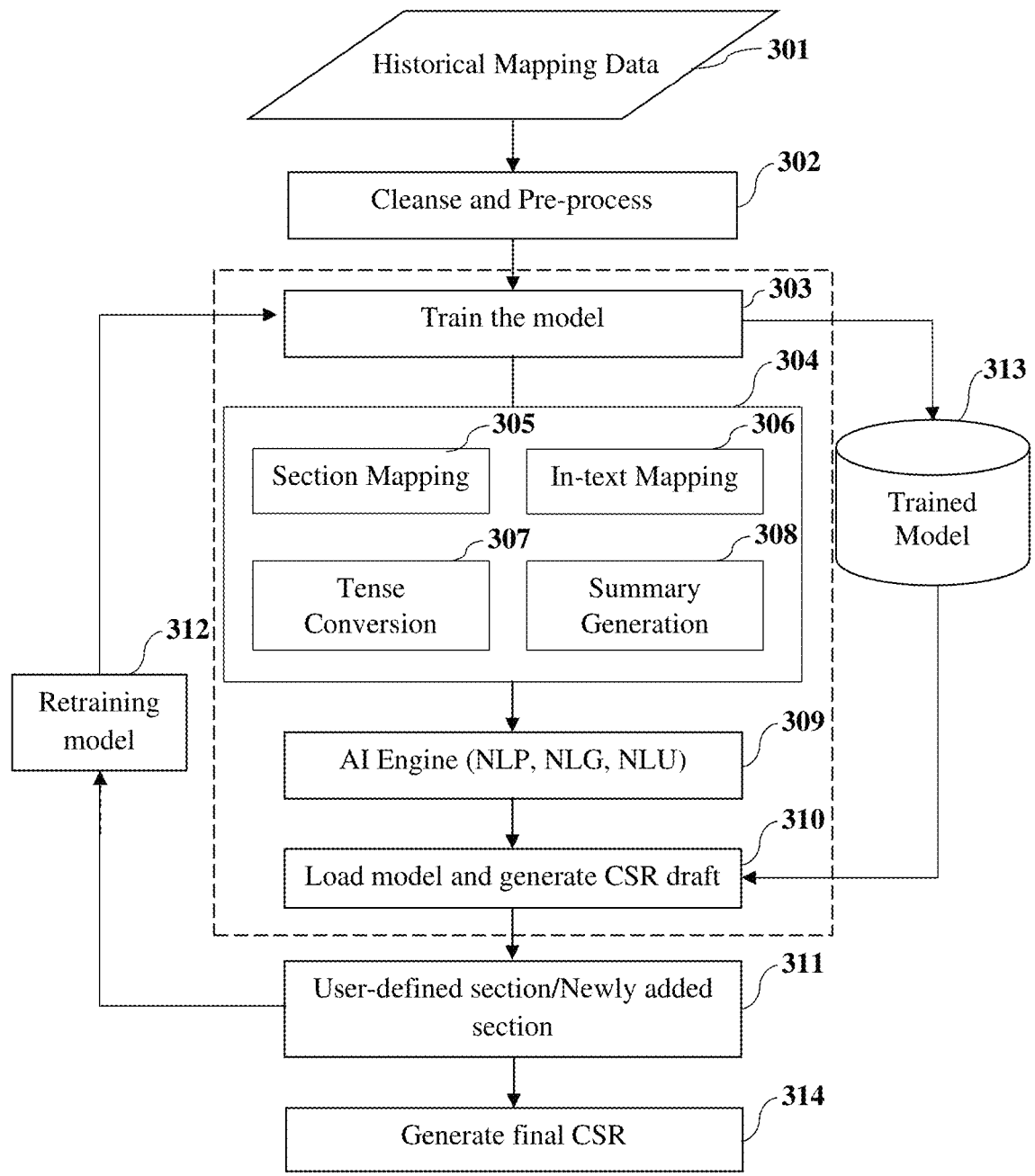
FIG. 3 exemplarily illustrates a flowchart of an embodiment of a method of applying artificial intelligence for automatically authoring a scientific document with minimal user intervention.

FIG. 3 exemplarily illustrates a flowchart of an embodiment of a method of applying artificial intelligence (AI) for automatically authoring a scientific document, for example, a clinical study report (CSR), with minimal user intervention. In an embodiment, the automated authoring engine comprises a machine learning (ML) module configured to generate and train a machine learning model. The ML module provides a machine learning algorithm with training data, for example, historical section mapping data, to learn from. The machine learning algorithm identifies patterns in the historical section mapping data that map input data attributes to target data attributes. The machine learning algorithm outputs the machine learning model that captures the identified patterns. As exemplarily illustrated in FIG. 3, the automated authoring engine receives historical mapping data 301 and performs cleansing and pre-processing 302 of the historical mapping data 301. By cleansing and pre-processing 302, the automated authoring engine transforms the historical mapping data 301 into an understandable format. The ML module receives the transformed historical mapping data 301 and proceeds to train 303 the machine learning model and generate a trained model 313. In an embodiment, the ML module trains 303 the machine learning model in communication with an AI engine 309 comprising a natural language processing (NLP) component, a natural language generation (NLG) component, and a natural language understanding (NLU) component. The AI engine 309 facilitates execution of multiple functions of the AI-enabled system 200 exemplarily illustrated in FIG. 2 and FIGS. 8-9, and the method disclosed herein. For example, the AI engine 309 facilitates the execution of AI-enabled functions 304 comprising section mapping 305, in-text mapping 306, tense conversion 307, and in-text table interpretation and summary generation 308. The ML module loads 310 the trained machine learning model 313 for generating a CSR draft. The section mapper 206 of the automated authoring engine exemplarily illustrated in FIG. 2, executes the section mapping algorithm for mapping the sections configured in the predefined CSR template with the content from the source documents as disclosed in the description of FIG. 5. In the execution of the section mapping algorithm, the section mapper 206 matches the sections defined in the predefined CSR template with the sections in the source documents uploaded by a user and utilizes the machine learning model 313 to obtain predictions on new data, for example, the content from the uploaded source documents. The document generator of the automated authoring engine generates and outputs the CSR draft with the mapped sections on a user interface and allows the user to add 311 new sections or sub-sections. The ML module utilizes the newly added sections to retrain 312 the machine learning model 313. On receiving the newly added sections or sub-sections, the document generator generates 314 the final CSR.

FIG. 4 exemplarily illustrates a flowchart of an embodiment of a natural language processing (NLP) algorithm executed for automatically extracting and pre-processing content from a source document. Consider an example where a source document 401, for example, a protocol document, is uploaded by a user and saved in a portable document format (PDF) in a common repository, for example, the source database. The section extractor 202 of the automated authoring engine exemplarily illustrated in FIG. 2, extracts 402 and passes sections listed in the Table of Contents (TOC) of the protocol document to a multilayer perceptron (MLP) model to obtain page numbers and section numbers of a "Title" section and a "Synopsis" section of the protocol document. The MLP model finds a best match with an accuracy of, for example, greater than about 80%. Based on the page numbers of the "Title" section and the "Synopsis" section, the section extractor 202 reads 403 title page content, for example, using a Camelot library. The Camelot library is a Python library that extracts content from a PDF file. In another example, the section extractor 202 reads 403 the title page content using a custom entity recognition model. The custom entity recognition model allows identification of different entity types and extraction of entities from the PDF file. The section extractor 202 reads 404 content from the first page of the "Synopsis" section, for example, using a PyMuPDF library. PyMuPDF is a Python binding for the MuPDF® software development kit (SDK) of Artifex Software, Inc. The MuPDF® SDK provides access to PDF files. The section extractor 202 compares 405 the content extracted from the title page and the synopsis page with the protocol document to ensure all field values are extracted. The section extractor 202 extracts missing values, if any, using the hypertext markup language (HTML) of the "Title" section of the protocol document. The extracted content constitutes the final output 406 of the section extractor 202. In an embodiment, the section extractor 202 adds the section numbers of the "Title" section and the "Synopsis" section to a list and sends the list along with the final output 406 to a report generator of the automated authoring engine for trackability, traceability, and generation of the traceability report.

Figure 5:
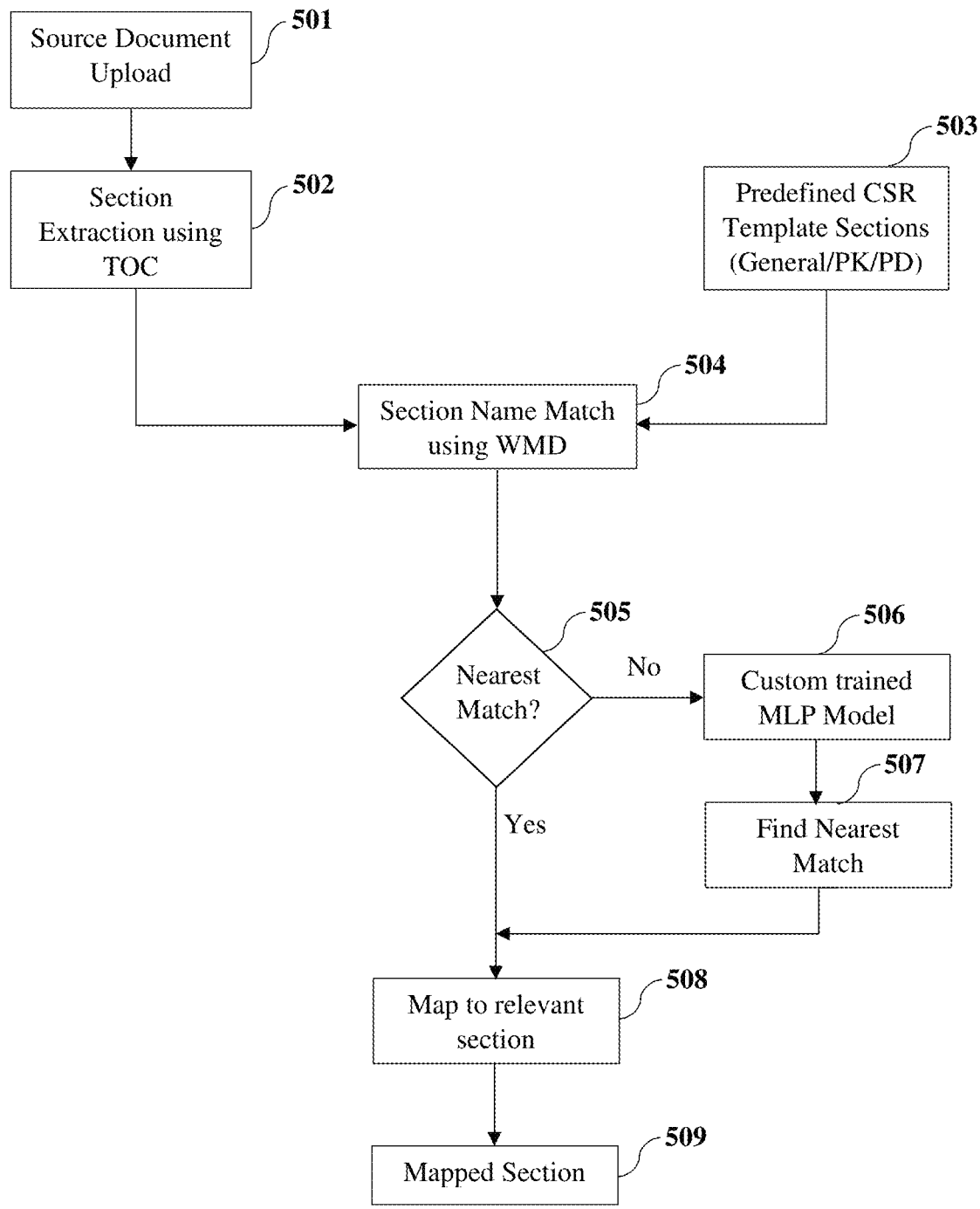
FIG. 5 exemplarily illustrates a flowchart of an embodiment of a section mapping algorithm executed for mapping sections configured in a scientific document template with content from multiple source documents.

FIG. 5 exemplarily illustrates a flowchart of an embodiment of the section mapping algorithm executed for mapping sections configured in a scientific document template, for example, a predefined clinical study report (CSR) template, with content from multiple source documents. The section extractor 202 of the automated authoring engine exemplarily illustrated in FIG. 2, receives 501 source documents uploaded by a user and obtains the table of contents (TOC) from the uploaded source documents. The section extractor 202 extracts 502 sections from the TOC of the uploaded source documents. The section extractor 202 also extracts 503 sections from the TOC of the predefined CSR template. The section extractor 202 determines the TOC of the predefined CSR template by study type, for example, a general type, a Pharmacokinetic/Pharmacodynamic (PK/PD) type, etc. For each section in the predefined CSR template, the section extractor 202 allows a user to select a file source, for example, a protocol, a statistical analysis plan, an in-text table, etc., from which content or information needs to be extracted based on business requirements.

Based on the selected file source, the section mapper 206 of the automated authoring engine exemplarily illustrated in FIG. 2, performs a section name match 504, for example, using Word Mover's Distance (WMD), to identify a close match between section names of the corresponding file source and section names of the predefined clinical study report (CSR) template. WMD measures a semantic distance between two documents, for example, the uploaded source document and the predefined CSR template. The section mapper 206 determines whether the nearest match is found 505. If WMD is unable to find the nearest match, the section mapper 206 passes the section name inputs to a custom trained multilayer perceptron (MLP) model 506. The MLP model 506 operates to find 507 a matching section from the uploaded source document. On finding the nearest match, the section mapper 206 maps 508 the content of the uploaded source document to a relevant section of the predefined CSR template and outputs the mapped section 509. For user-defined sections or sub-sections, the section extractor 202 performs pre-processing steps comprising, for example, removing stop words, numbers, punctuations, etc., post which, the section mapper 206 determines the best match for the user-defined sections or sub-sections, for example, using FuzzyWuzzy ratio, SequenceMatcher semantic similarity, etc., and returns the best match along with the mapping for the sections in the predefined CSR template. In an embodiment, the automated authoring engine improves section mapping accuracy and retrains the MLP model 506 in case of failed predictions. If the section mapping custom trained MLP model 506 fails to generate section predictions, the automated authoring engine captures and stores keywords that the user entered for section mapping, for example, in a keyword repository. The automated authoring engine retrains the MLP model 506 in periodic process batches, for example, nightly process batches, which helps in improving the section mapping and failed predictions from a previous run of the MLP model 506.

Figure 6:
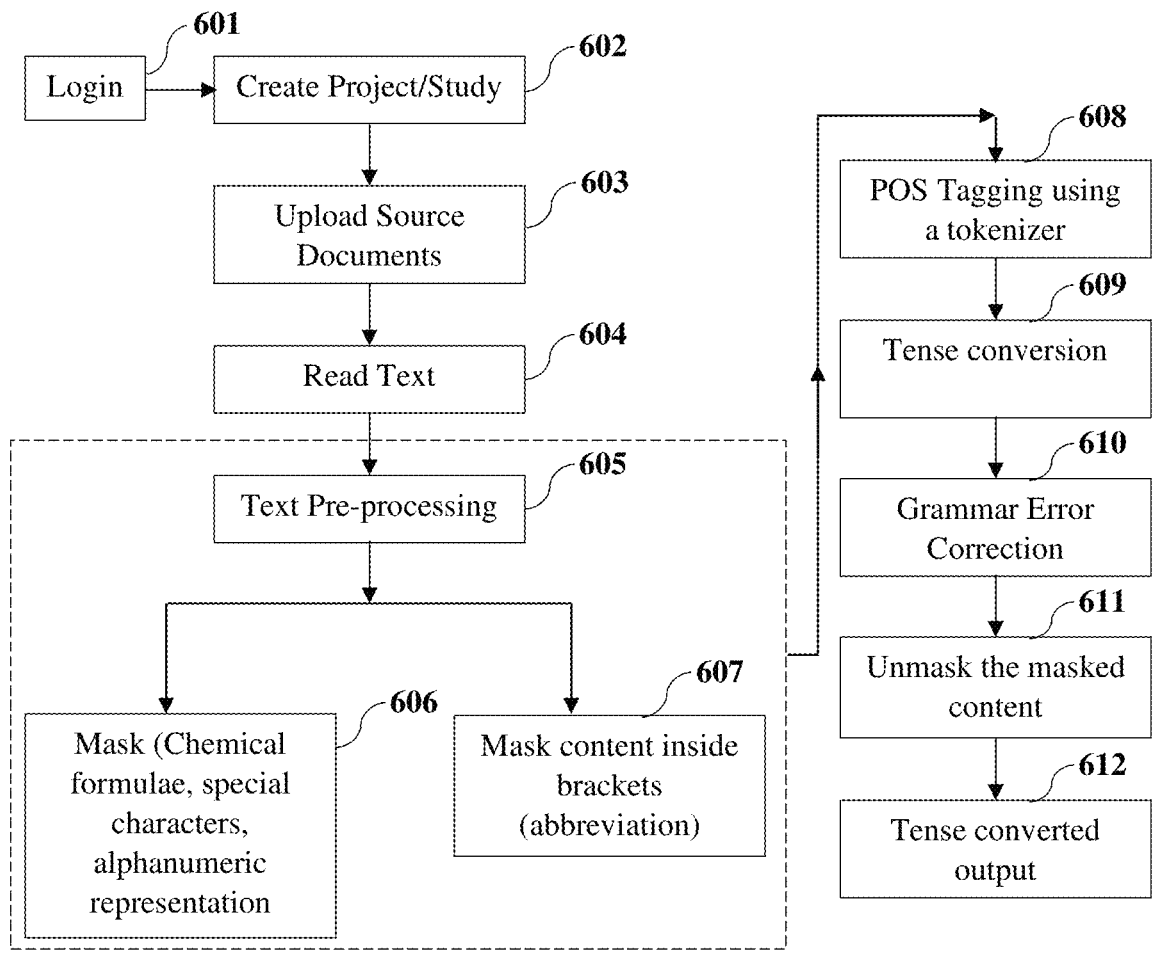
FIG. 6 exemplarily illustrates a flowchart of an embodiment of a natural language generation algorithm executed for automatically converting tenses of content in a scientific document based on user preferences.

FIG. 6 exemplarily illustrates a flowchart of an embodiment of a natural language generation (NLG) algorithm executed for automatically converting tenses of content in a scientific document based on user preferences. Consider an example where a user logs 601 into the artificial intelligence (AI)-enabled system via a graphical user interface (GUI) rendered by the automated authoring engine and creates 602 a project or a clinical study for automatically generating a clinical study report (CSR). The user then uploads 603 source documents for the CSR via the GUI. The automated authoring engine comprises a content editing module for executing one or more content editing functions on the CSR using natural language processing. The content editing module reads 604 content, for example, text, from the source documents and executes text pre-processing 605 as follows. The content editing module first masks 606 chemical formulae, special characters, alphanumeric representation, etc., from the text and then masks 607 content contained within brackets as content within brackets are typically abbreviations which do not have a tense that needs conversion. The content editing module detects verbs in the pre-processed text, for example, by using a spaCy© tokenizer of ExplosionAI UG. The spaCy© tokenizer tokenizes each word and performs part-of-speech (POS) tagging 608 to assign a POS tag to indicate a verb. Based on the POS tags, the content editing module converts 609 the tense of each word with respect to the sentence by executing a tense change custom algorithm, for example, a custom-made English grammar rules algorithm. Furthermore, in an embodiment, the content editing module corrects 610 grammar of the sentences by executing an English grammar error correction algorithm on the CSR to ensure the sentences with words whose tenses have been converted are grammatically correct. The content editing module then unmasks 611 the masked content, for example, the chemical formulae, special characters, alphanumeric representation, bracketed content, etc., to reflect the original content of the CSR. The content editing module outputs 612 the tense converted CSR.

FIG. 7 exemplarily illustrates a flowchart of an embodiment of a natural language understanding (NLU) algorithm executed for interpreting in-text tables from source documents and generating an in-text table summary. Consider an example where a user uploads 701 a source document comprising one or more in-text tables via a graphical user interface (GUI) rendered by the automated authoring engine. The in-text table interpreter of the automated authoring engine receives the source document comprising the in-text table(s) as input and detects an in-text table structure in the source document, for example, using a custom-trained detectron2 object detection model 702. The in-text table interpreter extracts 703 information from the in-text table structure in data frames using custom algorithms. The in-text table interpreter translates 704 meaning representation (MR) of an in-text table into a description in a natural language (NL), for example, using a custom-trained sequence-to-sequence (seq2seq) model, which is a deep learning model. In an embodiment, the in-text table interpreter employs the PyTorch machine learning framework to develop the seq2seq neural model. The in-text table interpreter trains 705 the seq2seq neural model on an in-text table interpretation dataset on a graphics processing unit (GPU). The in-text table interpreter implements a heuristic search algorithm, for example, a beam search algorithm, for evaluation. The in-text table interpreter then executes 706 an algorithm, for example, a bilingual evaluation understudy (BLEU) evaluation algorithm, for evaluating the quality of text that has been machine-translated from one natural language to another natural language, and reports BLEU scores. The in-text table interpreter generates 707 an in-text table summary based on a template detected using the seq2seq model. The in-text table interpreter then uses a multilayer perceptron (MLP) model to select 708 variables whose values need to be replaced and generates a final in-text table summary 709. In an embodiment, the automated authoring engine enhances in-text summary generation. When the user edits the in-text table summary from the generated scientific document, the automated authoring engine retrains the seq2seq model, which is based on remembering the previous word and the next word in language formation, during a periodic batch process, for example, a nightly batch process, for enhancing the in-text table summary with a real-time language.

Figure 8:
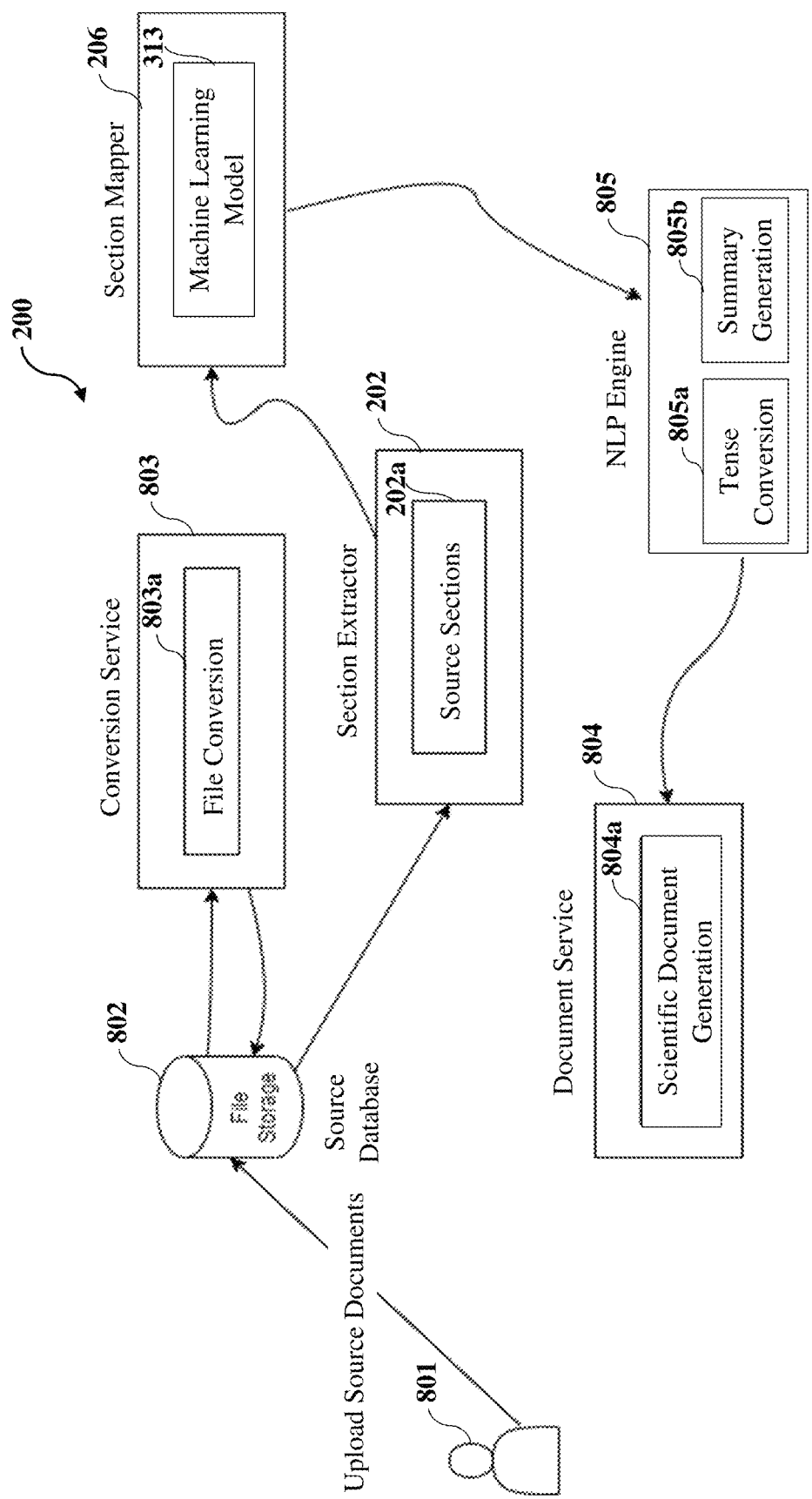
FIG. 8 exemplarily illustrates a high-level architectural block diagram of an artificial intelligence (AI)-enabled system for automatically authoring a scientific document using a machine learning model and natural language processing with minimal user intervention.

FIG. 8 exemplarily illustrates a high-level architectural block diagram of an artificial intelligence (AI)-enabled system 200 for automatically authoring a scientific document using a machine learning model and natural language processing (NLP) with minimal user intervention. In an embodiment, the AI-enabled system 200 comprises the source database 802, the section extractor 202, the section mapper 206, and an NLP engine 805 constituting the automated authoring engine 909 exemplarily illustrated in FIG. 9. In an embodiment, the AI-enabled system 200 allows a user 801 to access the automated authoring engine 909 via a graphical user interface (GUI). The user 801 uploads source documents, for example, a protocol document, a statistical analysis plan document, a case report form, safety narratives, in-text tables, post-text tables, summary reports, tables, listings, figures, etc., to the automated authoring engine 909 via the GUI. The automated authoring engine 909 stores the uploaded source documents in a file storage system, for example, the source database 802. In an embodiment, the AI-enabled system 200 implements a conversion service 803 for performing file conversion 803a and converting different formats of the source documents to a standard format, for example, a portable document format (PDF).

The section extractor 202 automatically extracts and pre-processes content from the source documents using natural language processing (NLP). Furthermore, the section extractor 202 extracts sections 202a from the source documents and passes the extracted sections to the section mapper 206. The section mapper 206 executes the section mapping algorithm disclosed in the description of FIG. 5, for mapping the sections configured in a scientific document template with the content from the source documents. The section mapper 206 matches the sections of the scientific document template with sections 202a extracted from the source documents; and predicts appropriate sections from among the sections in the scientific document template for rendering the content from the source documents based on the matching using the machine learning model 313 and historical scientific document information acquired from users. The NLP engine 805 performs content editing functions, for example, tense conversion 805a as disclosed in the description of FIG. 6, and in-text table interpretation and summary generation 805b as disclosed in the description of FIG. 7. The AI-enabled system 200 also implements a document service 804 for scientific document generation 804a. After section extraction by the section extractor 202, section mapping by the section mapper 206, and tense conversion 805a and summary generation 805b by the NLP engine 805, the document service 804 comprising the document generator generates the final scientific document, for example, a clinical study report (CSR).

Figure 9:
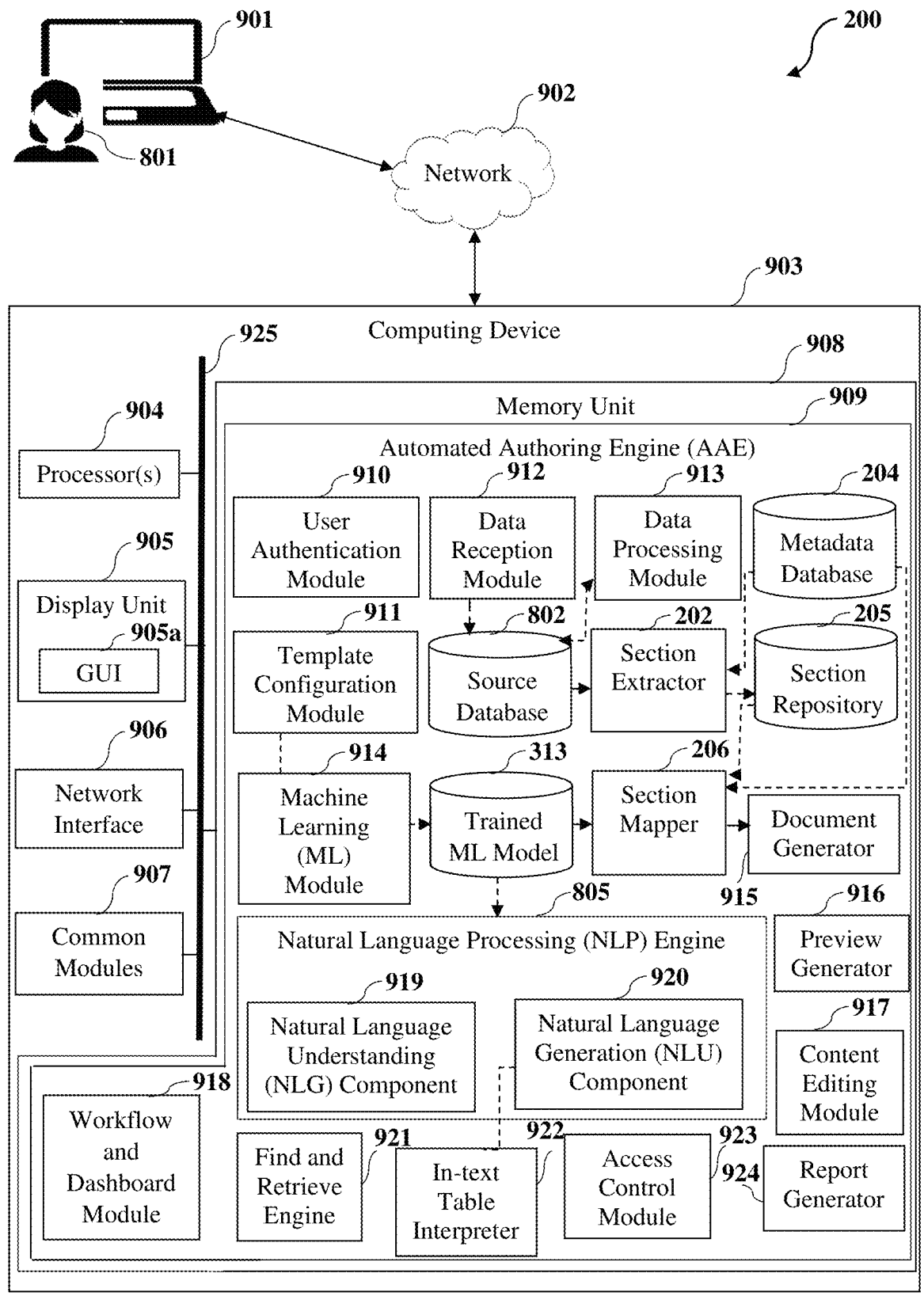
FIG. 9 illustrates an architectural block diagram of an exemplary implementation of the AI-enabled system comprising an automated authoring engine for automatically authoring a scientific document using a machine learning model and natural language processing with minimal user intervention.

FIG. 9 illustrates an architectural block diagram of an exemplary implementation of the artificial intelligence (AI)-enabled system 200 comprising the automated authoring engine 909 for automatically authoring a scientific document using a machine learning model 313 and natural language processing (NLP) with minimal user intervention. In an embodiment, the automated authoring engine 909 is deployed in a computing device 903 as exemplarily illustrated in FIG. 9. The computing device 903 is a computer system programmable using high-level computer programming languages. The computing device 903 is an electronic device, for example, one or more of a personal computer, a tablet computing device, a mobile computer, a mobile phone, a smartphone, a portable computing device, a laptop, a wearable computing device such as smart glasses, a touch centric device, a workstation, a client device, a server, a portable electronic device, a network-enabled computing device, an interactive network-enabled communication device, an image capture device, any other suitable computing equipment, combinations of multiple pieces of computing equipment, etc. In an embodiment, the automated authoring engine 909 is implemented in the computing device 903 using programmed and purposeful hardware. In an embodiment, the automated authoring engine 909 is a computer-embeddable system that automatically authors a scientific document using a machine learning model 313 and NLP with minimal user intervention.

The automated authoring engine 909 is accessible to a user 801 through a broad spectrum of technologies and user devices 901, for example, personal computers with access to the internet, laptops, internet-enabled cellular phones, smartphones, tablet computing devices, etc. The automated authoring engine 909 in the computing device 903 communicates with a user device 901 via a network 902, for example, a short-range network or a long-range network. The automated authoring engine 909 interfaces with the user device 901 and in an embodiment, with one or more database systems (not shown) and servers (not shown) to implement the automated authoring service, and therefore more than one specifically programmed computing system is used for implementing the automated authoring service. The network 902 is, for example, one of the internet, satellite internet, an intranet, a wired network, a wireless network, a communication network that implements Bluetooth© of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the automated authoring engine 909 is implemented in a cloud computing environment. As used herein, "cloud computing environment" refers to a processing environment comprising configurable, computing, physical, and logical resources, for example, networks, servers, storage media, virtual machines, applications, services, etc., and data distributed over the network 902. The cloud computing environment provides an on-demand network access to a shared pool of the configurable computing physical and logical resources.

In an embodiment, the automated authoring engine 909 is a cloud computing-based platform implemented as a service for automatically authoring a scientific document using a machine learning model 313 and NLP with minimal user intervention. For example, the automated authoring engine 909 is configured as a software as a service (SaaS) platform or a cloud-based software as a service (CSaaS) platform that automatically authors a scientific document using a machine learning model 313 and NLP with minimal user intervention. In another embodiment, the automated authoring engine 909 is implemented as an on-premise platform comprising on-premise software installed and run on client systems on the premises of an organization.

As exemplarily illustrated in FIG. 9, the computing device 903 comprises a non-transitory, computer-readable storage medium, for example, a memory unit 908, for storing computer program instructions defined by modules, for example, 202, 204, 205, 206, 805, 910, 911, 912, 913, 914, 915, 916, 917, 918, 919, 920, 921, 922, 923, 924, etc., of the automated authoring engine 909. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 903 further comprises at least one processor 904 operably and communicatively coupled to the memory unit 908 for executing the computer program instructions defined by the modules, for example, 202, 204, 205, 206, 805, 910 to 924, etc., of the automated authoring engine 909. The memory unit 908 is a storage unit used for recording, storing, and reproducing data, computer program instructions, and applications. In an embodiment, the memory unit 908 comprises a random-access memory (RAM) or another type of dynamic storage device that serves as a read and write internal memory and provides short-term or temporary storage for information and computer program instructions executable by the processor(s) 904. The memory unit 908 also stores temporary variables and other intermediate information used during execution of the computer program instructions by the processor(s) 904. In another embodiment, the memory unit 908 further comprises a read-only memory (ROM) or another type of static storage device that stores firmware, static information, and computer program instructions for execution by the processor(s) 904. In an embodiment, the modules, for example, 202, 204, 205, 206, 805, 910 to 924, etc., of the automated authoring engine 909 are stored in the memory unit 908.

The processor(s) 904 is configured to execute the modules, for example, 202, 204, 205, 206, 805, 910 to 924, etc., of the automated authoring engine 909 for automatically authoring a scientific document using a machine learning model 313 and NLP with minimal user intervention. The modules, for example, 202, 204, 205, 206, 805, 910 to 924, etc., of the automated authoring engine 909, when loaded into the memory unit 908 and executed by the processor(s) 904, transform the computing device 903 into a specially-programmed, special purpose computing device configured to implement the functionality disclosed herein. The processor(s) 904 refers to one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor(s) 904 is implemented as a processor set comprising, for example, a programmed microprocessor and a math or graphics co-processor. The automated authoring engine 909 is not limited to employing the processor(s) 904. In an embodiment, the automated authoring engine 909 employs a controller or a microcontroller.

As exemplarily illustrated in FIG. 9, the computing device 903 further comprises a data bus 925, a display unit 905, a network interface 906, and common modules 907 of a computer system. The data bus 925 permits communications and exchange of data between the components, for example, 904, 905, 906, 907, and 908 of the computing device 903. The data bus 925 transfers data to and from the memory unit 908 and into or out of the processor(s) 904. The display unit 905, via a graphical user interface (GUI) 905a, displays user interface elements such as input fields for allowing a user 801, for example, to upload source documents to be used for section mapping and generation of the scientific document, to configure or define new sections or sub-sections into a preconfigured scientific document template, etc. In an embodiment, the automated authoring engine 909 renders the GUI 905a on the display unit 905 for receiving inputs from the user 801, for example, keywords used to find and retrieve additional information to be rendered in appropriate sections of the preconfigured scientific document template. In an embodiment, the automated authoring engine 909 renders the GUI 905a on the user device 901 via the network 902 to allow the user 801 to perform the above-disclosed actions. The GUI 905a comprises, for example, any one of an online web interface, a web-based downloadable application interface, a mobile-based downloadable application interface, etc.

The network interface 906 is configured to connect the computing device 903 to the network 902. In an embodiment, the network interface 906 is provided as an interface card also referred to as a line card. The network interface 906 is, for example, one or more of infrared interfaces, interfaces implementing Wi-Fi® of Wi-Fi Alliance Corporation, universal serial bus (USB) interfaces, Ethernet interfaces, frame relay interfaces, cable interfaces, digital subscriber line interfaces, token ring interfaces, peripheral component interconnect (PCI) interfaces, local area network (LAN) interfaces, wide area network (WAN) interfaces, interfaces using serial protocols, interfaces using parallel protocols, asynchronous transfer mode interfaces, fiber distributed data interfaces (FDDI), interfaces based on transmission control protocol (TCP)/internet protocol (IP), interfaces based on wireless communications technology such as satellite technology, radio frequency technology, near field communication, etc. The common modules 907 of the computing device 903 comprise, for example, input/output (I/O) controllers, input devices, output devices, fixed media drives such as hard drives, removable media drives for receiving removable media, etc. The output devices output the results of operations performed by the automated authoring engine 909. For example, the automated authoring engine 909 renders the scientific document, for example, a clinical study report (CSR), to the user 801 of the automated authoring engine 909 using the output devices. Computer applications and programs are used for operating the computing device 903. The programs are loaded onto fixed media drives and into the memory unit 908 via the removable media drives. In an embodiment, the computer applications and programs are loaded into the memory unit 908 directly via the network 902.

In the exemplary implementation illustrated in FIG. 9, the automated authoring engine 909 comprises a template configuration module 911, a data reception module 912, a data processing module 913, the section extractor 202, a machine learning (ML) module 914, the section mapper 206, a document generator 915, a content editing module 917, a natural language processing (NLP) engine 805, an in-text table interpreter 922, and multiple databases, for example, the source database 802, the metadata database 204, and the section repository 205. The template configuration module 911 configures a scientific document template, for example, a clinical study report (CSR) template, comprising multiple sections, for example, fixed sections, based on scientific document requirements, for example, the International Council for Harmonisation of Technical Requirements for Pharmaceuticals for Human Use (ICH) E3 guidelines. The scientific document requirements, for example, the ICH E3 guidelines, are stored in the metadata database 204. In an embodiment, the automated authoring engine 909 further comprises a user authentication module 910 configured to authenticate and provide access of the automated authoring engine 909 to authorized users, for example, medical writers, co-authors, reviewers, approvers, etc. A user 801 logs into the automated authoring engine 909 via a user interface, for example, a graphical user interface (GUI), rendered by the automated authoring engine 909 and accessible on the user device 901, and after authentication by the user authentication module 910, uploads multiple source documents for automatic generation of a scientific document. The data reception module 912 receives the uploaded source documents and stores the source documents in the source database 802. In an embodiment, the data processing module 913 performs file conversion of the source documents to convert the source documents of different formats into a standardized format, for example, a portable document format (PDF). The data processing module 913 stores the converted source documents in the source database 802. In an embodiment, the user 801 configures one or more subsections under the fixed sections of the scientific document template via the GUI rendered by the automated authoring engine 909. The ML module 914, in communication with the template configuration module 911, configures the user-configured sub-section(s) as feedback to retrain the machine learning model 313.

The section extractor 202 automatically extracts and pre-processes content from the source documents using NLP as disclosed in the description of FIG. 4. In an embodiment, the data processing module 913, in communication with the section extractor 202, pre-processes the content from the source documents using NLP. The section extractor 202 extracts the sections configured in the scientific document template and sections from the source documents and stores the extracted sections in the section repository 205. The section mapper 206, in communication with the section repository 205 and the metadata database 204, maps the sections configured in the scientific document template with the content from the source documents by executing the section mapping algorithm disclosed in the description of FIG. 5. For section mapping, the section mapper 206 matches the sections of the scientific document template with the sections extracted from the source documents and in an embodiment, if a near match is not found, the section mapper 206 employs the machine learning model 313 trained by the ML module 914 for predicting appropriate sections from among the sections in the scientific document template for rendering the content from the source documents based on the matching. The ML module 914 trains the machine learning model 313 using historical scientific document information acquired from different users involved in preparing scientific documents. In an embodiment, the NLP engine 805 employs the trained machine learning model 313 for performing various functions of the method disclosed herein.

FIGS. 13A-13L exemplarily illustrate a computer program code of the section mapper 206 executable by the processor(s) 904 for mapping the sections configured in the scientific document template with the content from the source documents.

The document generator 915, in communication with the section mapper 206, automatically generates the scientific document by rendering the content from the source documents into the predicted sections of the scientific document template. In an embodiment as exemplarily illustrated in FIG. 9, the document generator 915 is external to the section mapper 206 and in communication with the section mapper 206, automatically generates the scientific document. In another embodiment (not shown), the document generator 915 is built-into the section mapper 206 and automatically generates the scientific document therewithin as disclosed in the description of FIG. 2. In an embodiment, the automated authoring engine 909 further comprises a preview generator 916 for generating and rendering a preview of the automatically generated scientific document on a preview screen of the GUI for subsequent editing and automatic regeneration of the scientific document. The preview of the scientific document allows the user 801 to review and edit the scientific document.

The content editing module 917 executes one or more content editing functions on the automatically generated scientific document using NLP. In an embodiment, the content editing module 917 highlights data fields in the automatically generated scientific document that require attention and editing from the user 801. In another embodiment, the content editing module 917 executes post-text to in-text conversion as disclosed in the description of FIG. 1. In an embodiment, the content editing module 917 employs the NLP engine 805 for executing one or more content editing functions on the automatically generated scientific document. The NLP engine 805 comprises a natural language generation (NLG) component 919 for facilitating execution of a content editing function, for example, tense conversion, by the content editing module 917. The content editing module 917, in communication with the NLG component 919 of the NLP engine 805, automatically converts tenses of the content in the automatically generated scientific document based on user preferences by execution of an NLG algorithm as disclosed in the description of FIG. 6. The NLP engine 805 further comprises a natural language understanding (NLU) component 920 for facilitating interpretation of in-text tables from the source documents and generation of an in-text table summary by the in-text table interpreter 922. The in-text table interpreter 922, in communication with the NLU component 920 of the NLP engine 805, interprets in-text tables from the source documents and generates an in-text table summary by execution of an NLU algorithm as disclosed in the description of FIG. 7. FIGS. 14A-14H exemplarily illustrate a computer program code of the in-text table interpreter 922 executable by the processor(s) 904 for interpreting in-text tables from the source documents.

In an embodiment, the automated authoring engine 909 further comprises a find and retrieve engine 921 configured to fetch and display, in response to a user input, additional information from the source documents for selection and rendering into one or more of the sections in the scientific document template. The user 801 may enter a keyword as the user input on the GUI for fetching and adding information from the source documents into one or more of the sections in the scientific document template. In an embodiment, the ML module 914 extracts and configures the user input as additional feedback to retrain the machine learning model 313. FIGS. 15A-15D exemplarily illustrate a computer program code of the find and retrieve engine 921 executable by the processor(s) 904 for fetching and displaying, in response to a user input, additional information from the source documents for selection and rendering into one or more of the sections in the scientific document template.

In an embodiment, the automated authoring engine 909 further comprises an access control module 923 configured to provide selective access of an entirety of the automatically generated scientific document to one or more co-authors of the automatically generated scientific document for performing one or more actions on the automatically generated scientific document. In another embodiment, the access control module 923 is configured to provide selective access of one or more sections of the automatically generated scientific document to one or more co-authors of the automatically generated scientific document for performing one or more actions on the automatically generated scientific document.

In an embodiment, the automated authoring engine 909 further comprises a workflow and dashboard module 918 configured in accordance with sponsor requirements. Through the workflow and dashboard module 918, the user, for example, a primary author, sends the finalized scientific document to one or more reviewers for a review process. The workflow and dashboard module 918 allows the primary author to send the scientific document to multiple reviewers. The workflow and dashboard module 918 allows the reviewer(s) to add comments and send the scientific document with the comments back to the primary author. The workflow and dashboard module 918 allows the primary author to view all the comments or changes performed in the scientific document by the reviewer(s), dynamically in real time. In an embodiment, the workflow and dashboard module 918 allows the primary author to view all the comments in a consolidated view on the GUI. The workflow and dashboard module 918 allows execution of multiple iterations between the primary author and the reviewer(s). Once the review of the scientific document is finalized, the workflow and dashboard module 918 allows the primary author to send the reviewed scientific document to an approver for executing an approval process.

Similar to the reviewer, the workflow and dashboard module 918 allows the approver to add comments and send the scientific document back to the primary author. The workflow and dashboard module 918 allows the primary author to view all the comments or changes performed in the scientific document by the approver, dynamically in real time. The workflow and dashboard module 918 allows execution of multiple iterations between the primary author and the approver. Once the approver finalizes the scientific document, the workflow is completed. The workflow and dashboard module 918 stores all versions of the scientific document in the section repository 205 and allows the primary author to view and/or download any version of the scientific document, for example, via a "Version History" tab 1032 provided on the GUI 1000 as exemplarily illustrated in FIG. 10V. In an embodiment, the workflow and dashboard module 918 also allows the primary author to download an audit report of all the actions performed in the generation of the scientific document. In an embodiment, the automated authoring engine 909 further comprises a report generator 924 configured to generate and render multiple reports on the GUI for viewing and/or downloading by the user 801. The reports comprise, for example, a traceability report, an audit report, and a version control or version history report as disclosed in the description of FIG. 1.

The processor(s) 904 retrieves instructions defined by the user authentication module 910, the template configuration module 911, the data reception module 912, the data processing module 913, the section extractor 202, the machine learning (ML) module 914, the section mapper 206, the document generator 915, the preview generator 916, the content editing module 917, the NLP engine 805, the in-text table interpreter 922, the find and retrieve engine 921, the access control module 923, the workflow and dashboard module 918, and the report generator 924, from the memory unit 908 for executing the respective functions disclosed above. The modules 202, 204, 205, 206, 805, 910 to 924, etc., of the automated authoring engine 909 are disclosed above as software executed by the processor(s) 904. In an embodiment, the modules 202, 204, 205, 206, 805, 910 to 924, etc., of the automated authoring engine 909 are implemented completely in hardware. In another embodiment, the modules 202, 204, 205, 206, 805, 910 to 924, etc., of the automated authoring engine 909 are implemented by logic circuits to carry out their respective functions disclosed above. In another embodiment, the automated authoring engine 909 is also implemented as a combination of hardware and software including one or more processors, for example, 904, that are used to implement the modules, for example, 202, 204, 205, 206, 805, 910 to 924, etc., of the automated authoring engine 909.

For purposes of illustration, the disclosure herein refers to the modules 202, 204, 205, 206, 805, 910 to 924, etc., of the automated authoring engine 909 being run locally on a single computing device 903; however the scope of the AI-enabled system 200 and the method disclosed herein is not limited to the modules 202, 204, 205, 206, 805, 910 to 924, etc., of the automated authoring engine 909 being run locally on a single computing device 903 via the operating system and the processor(s) 904, but extends to running the modules 202, 204, 205, 206, 805, 910 to 924, etc., of the automated authoring engine 909 remotely over the network 902, for example, by employing a web browser, one or more remote servers, computers, mobile phones, and/or other electronic devices. In an embodiment, one or more modules, databases, processing elements, memory elements, storage elements, etc., of the AI-enabled system 200 disclosed herein are distributed across a cluster of computer systems (not shown), for example, computers, servers, virtual machines, containers, nodes, etc., coupled to the network 902, where the computer systems coherently communicate and coordinate with each other to share resources, distribute workload, and execute different portions of the logic to automatically author a scientific document using the machine learning model 313 and NLP with minimal user intervention.

The non-transitory, computer-readable storage medium disclosed herein stores computer program instructions executable by the processor(s) 904 for automatically authoring a scientific document using a machine learning model 313 and NLP with minimal user intervention. The computer program instructions implement the processes of various embodiments disclosed above and perform additional steps that may be required and contemplated for automatically authoring a scientific document using a machine learning model 313 and NLP with minimal user intervention. When the computer program instructions are executed by the processor(s) 904, the computer program instructions cause the processor(s) 904 to perform the steps of the method for automatically authoring a scientific document using a machine learning model 313 and NLP with minimal user intervention as disclosed in the descriptions of FIGS. 1-7. In an embodiment, a single piece of computer program code comprising computer program instructions performs one or more steps of the method disclosed in the descriptions of FIGS. 1-7. The processor(s) 904 retrieves these computer program instructions and executes them.

A module, or an engine, or a unit, as used herein, refers to any combination of hardware, software, and/or firmware. As an example, a module, or an engine, or a unit includes hardware such as a microcontroller associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Visual Basic®, hypertext preprocessor (PHP), Microsoft® .NET, Objective-C®, etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

The AI-enabled system 200 comprising the automated authoring engine 909 and the method disclosed herein provide an improvement in document generation technology. In the AI-enabled system 200 and the method disclosed herein, the design and the flow of interactions between the section extractor 202, the ML module 914, the section mapper 206, the NLP engine 805, other modules 916, 917, 921, 922, etc., of the automated authoring engine 909 are deliberate, designed, and directed. Every source document received by the automated authoring engine 909 via the GUI provided by the automated authoring engine 909, is configured by the automated authoring engine 909 to steer the source document towards a finite set of predictable outcomes. The automated authoring engine 909 implements one or more specific computer programs to direct each source document towards a set of end results. The interactions designed by the automated authoring engine 909 allow the automated authoring engine 909 to configure a scientific document template comprising multiple fixed sections and user-configurable sections or sub-sections based on scientific document requirements; automatically extract and preprocess content from the source documents using NLP; map the sections configured in the scientific document template with the content from the source documents; and from these mapped sections, through the use of other, separate and autonomous computer programs, automatically generate the scientific document by rendering the content from the source documents into the mapped sections of the scientific document template, and execute one or more content editing functions, for example, tense conversion, data field highlighting, post-text to in-text conversion, in-text table interpretation and summary generation, etc., on the automatically generated scientific document using NLP. The scientific document template configuration, the section extraction, and the section mapping are used as triggers to automatically generate the scientific document by rendering the content from the source documents into the mapped sections of the scientific document template. To perform the above disclosed method steps requires six or more separate computer programs and subprograms, the execution of which cannot be performed by a person using a generic computer with a generic program.

Figure 10A:
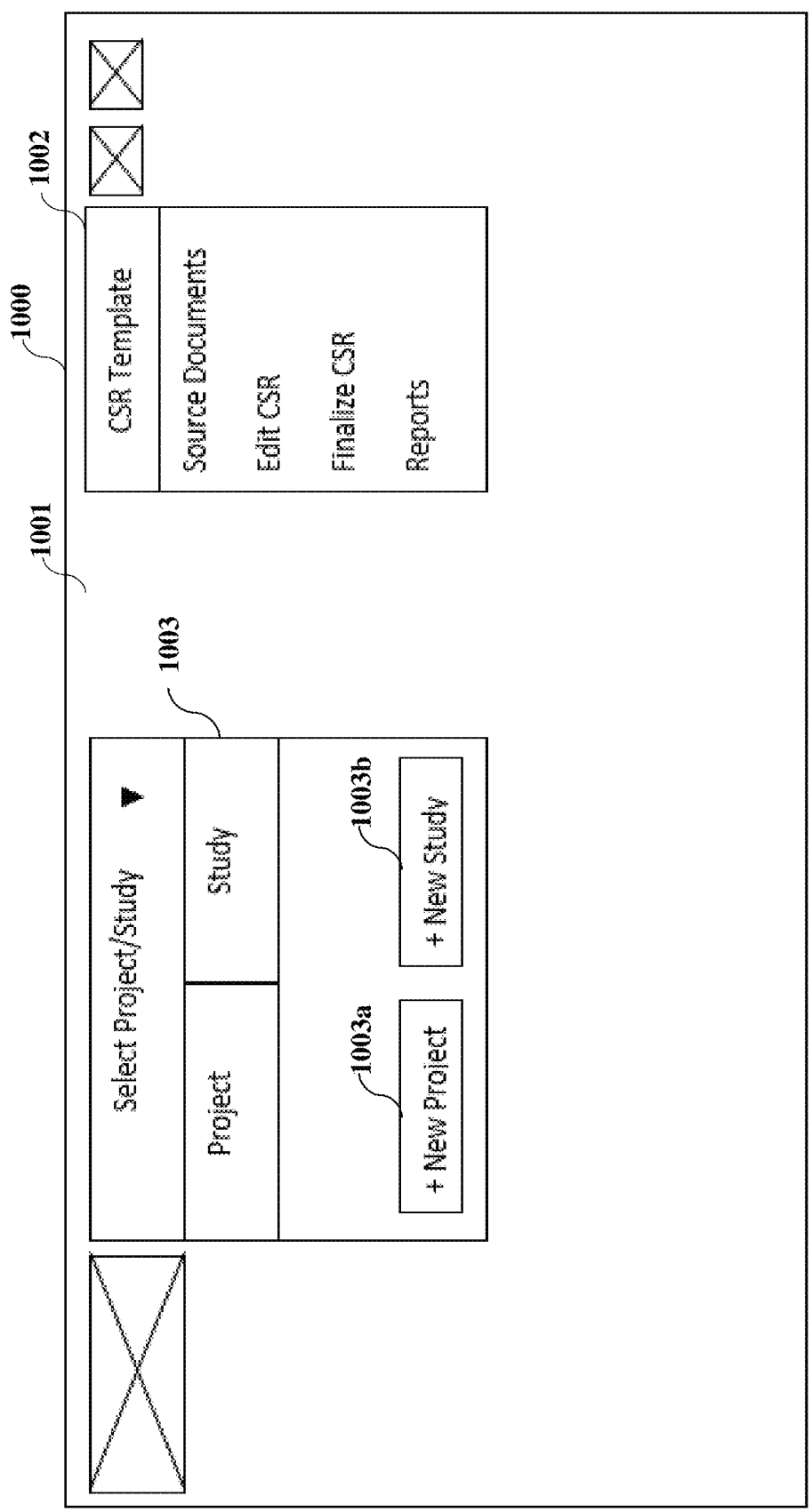
FIGS. 10A-10V exemplarily illustrate different pages of a graphical user interface rendered by the automated authoring engine of the AI-enabled system for automatically authoring a scientific document using a machine learning model and natural language processing with minimal user intervention.
Figure 10B:
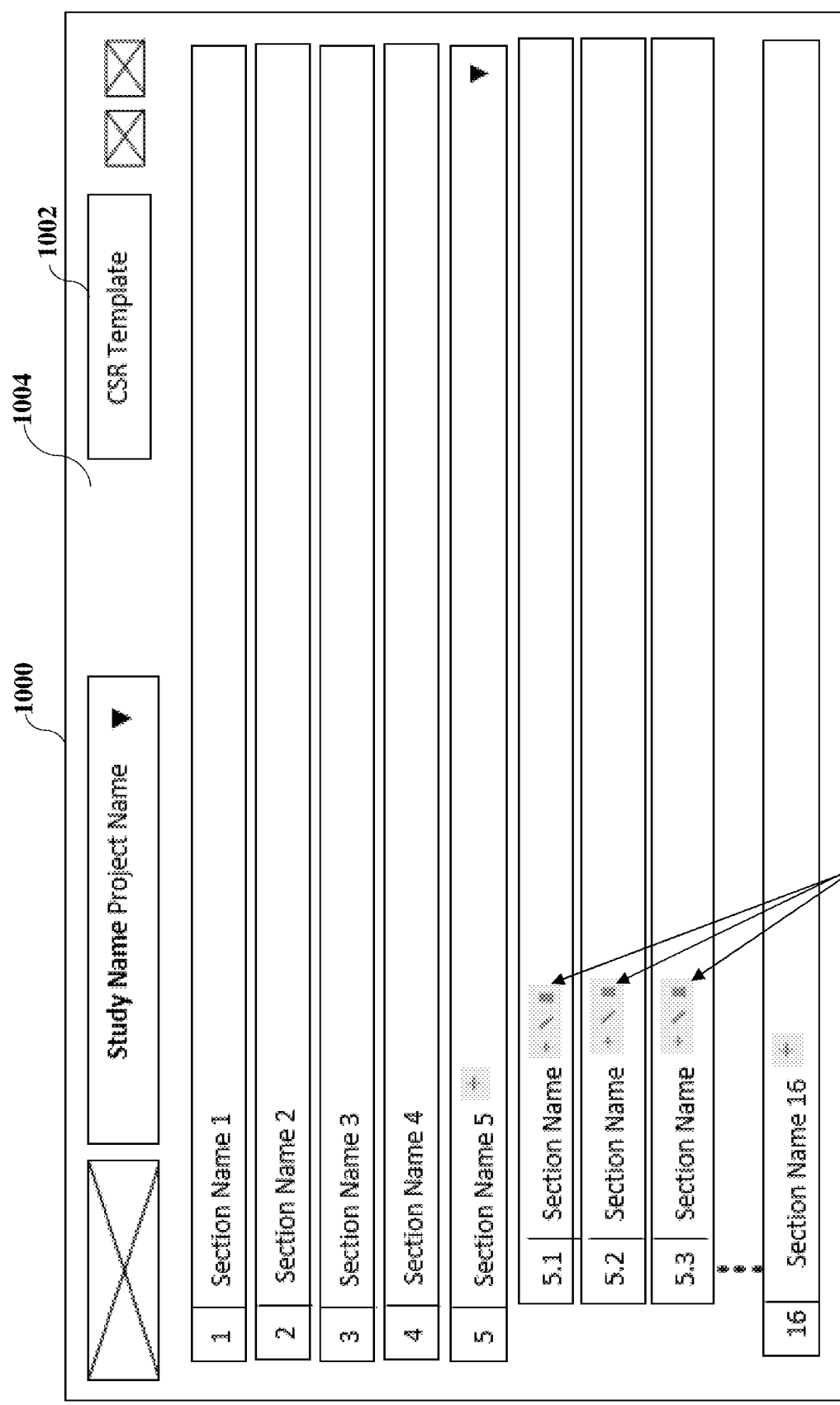
Figure 10D:
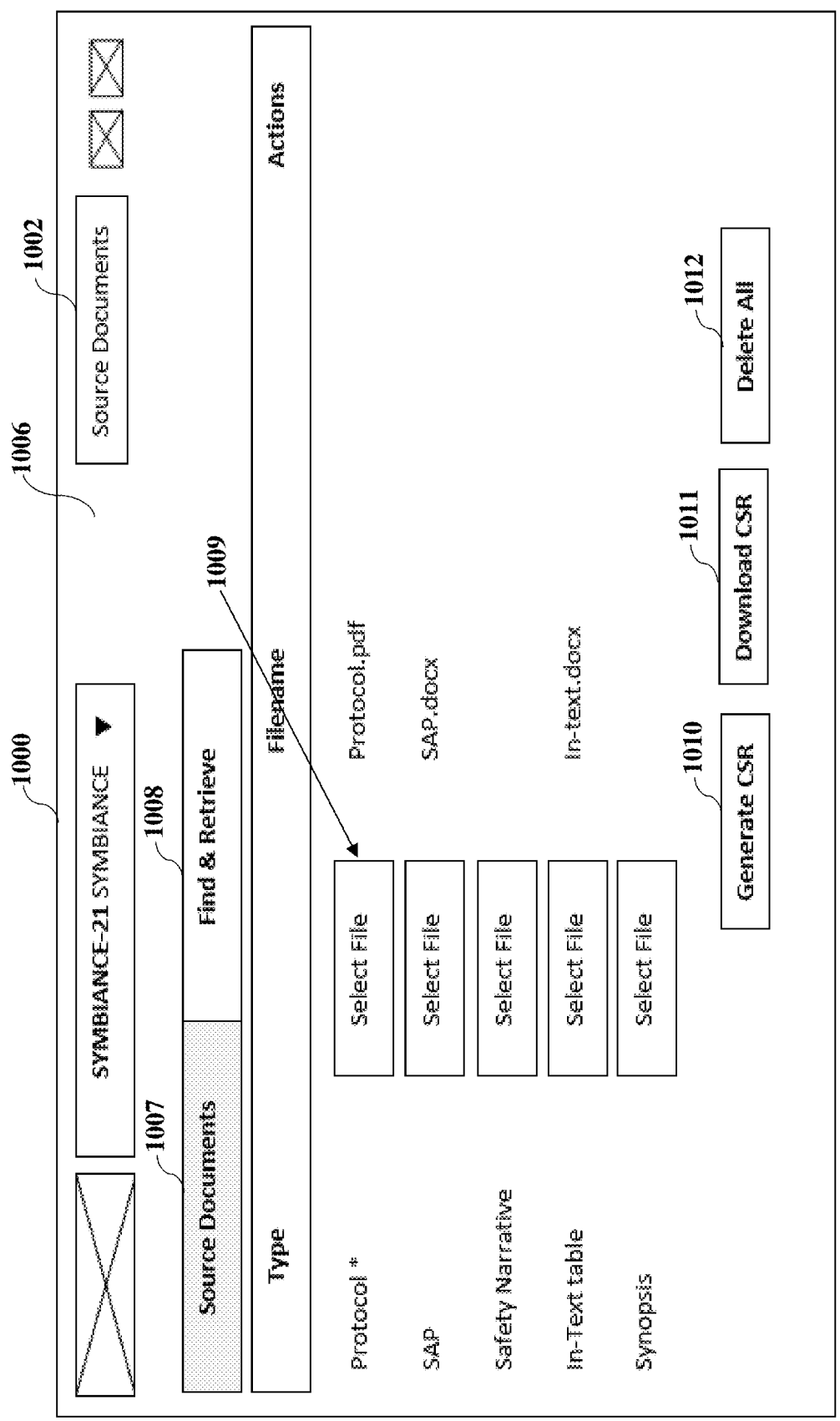
Figure 10E:
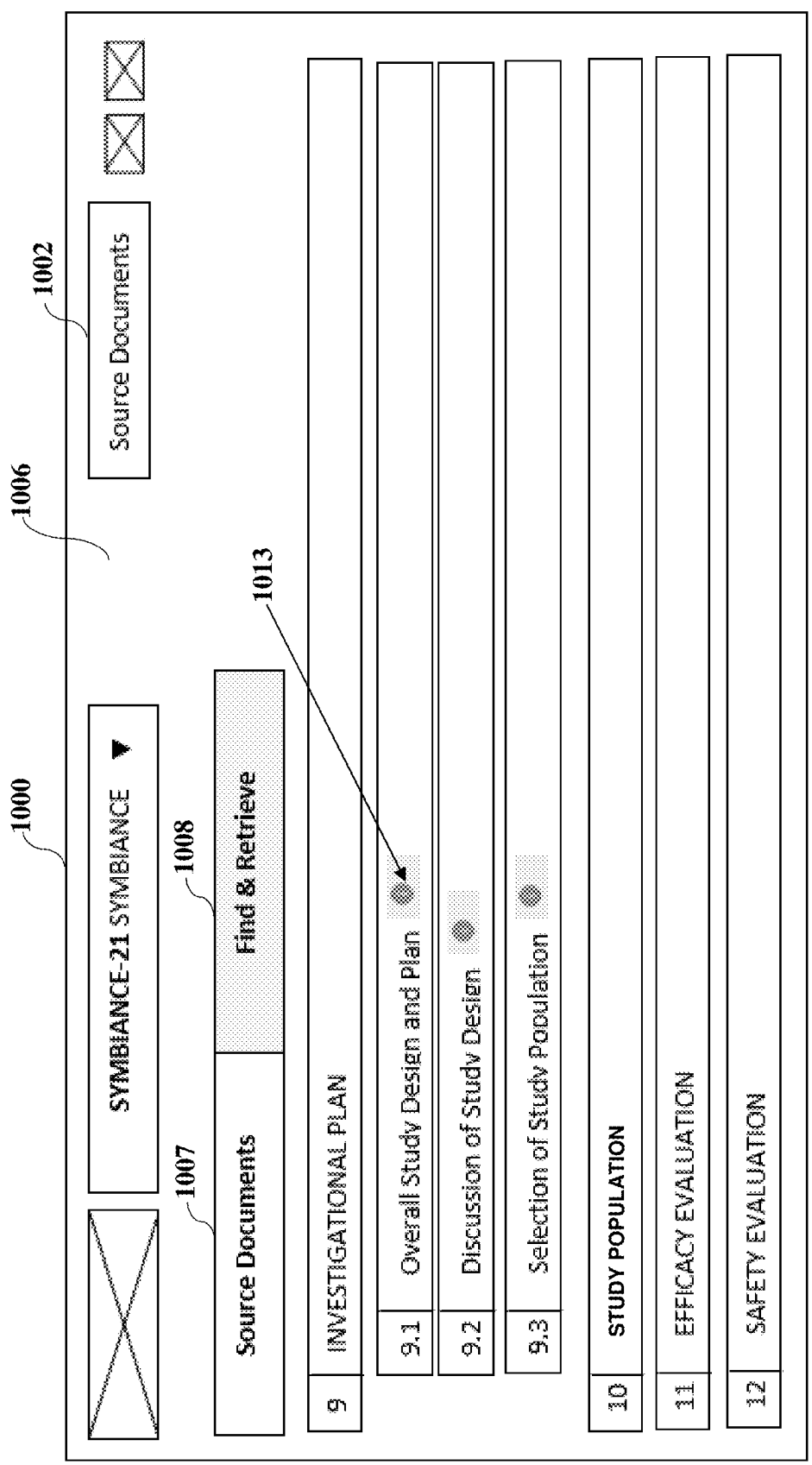
Figure 10F:
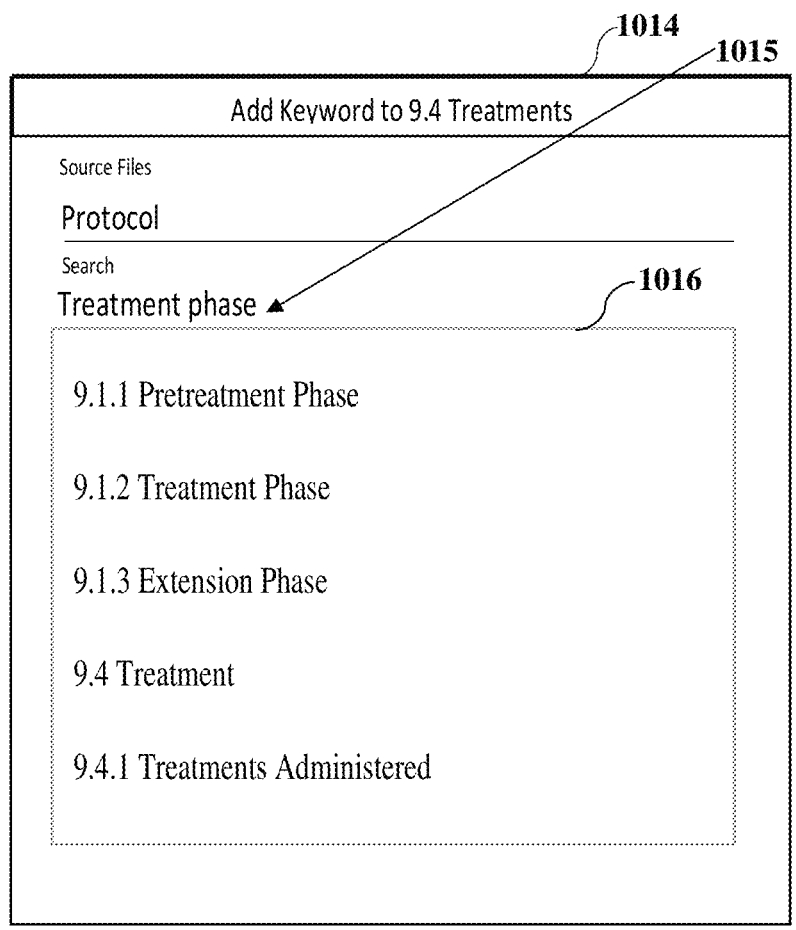
Figure 10G:
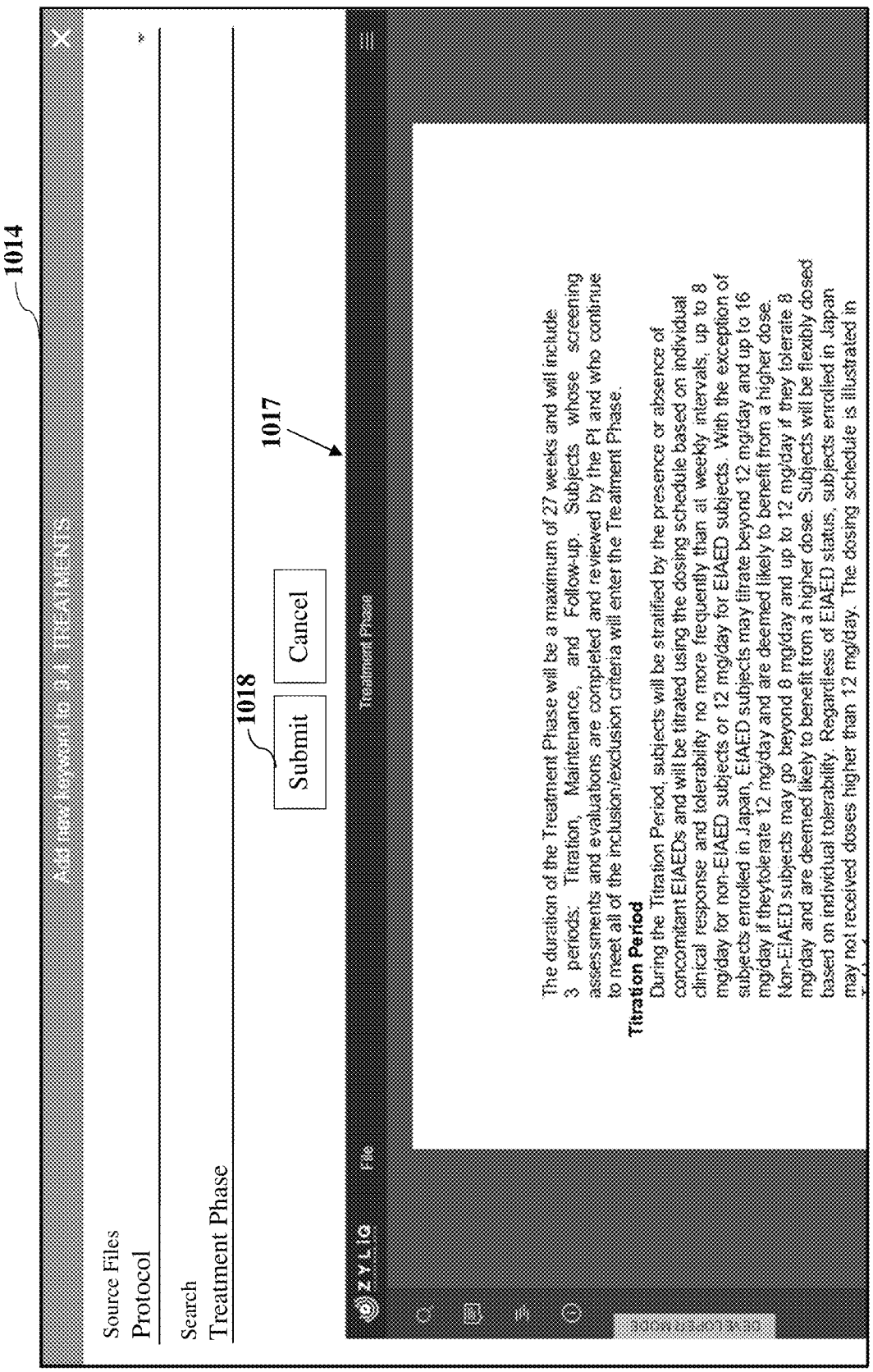
Figure 10K:
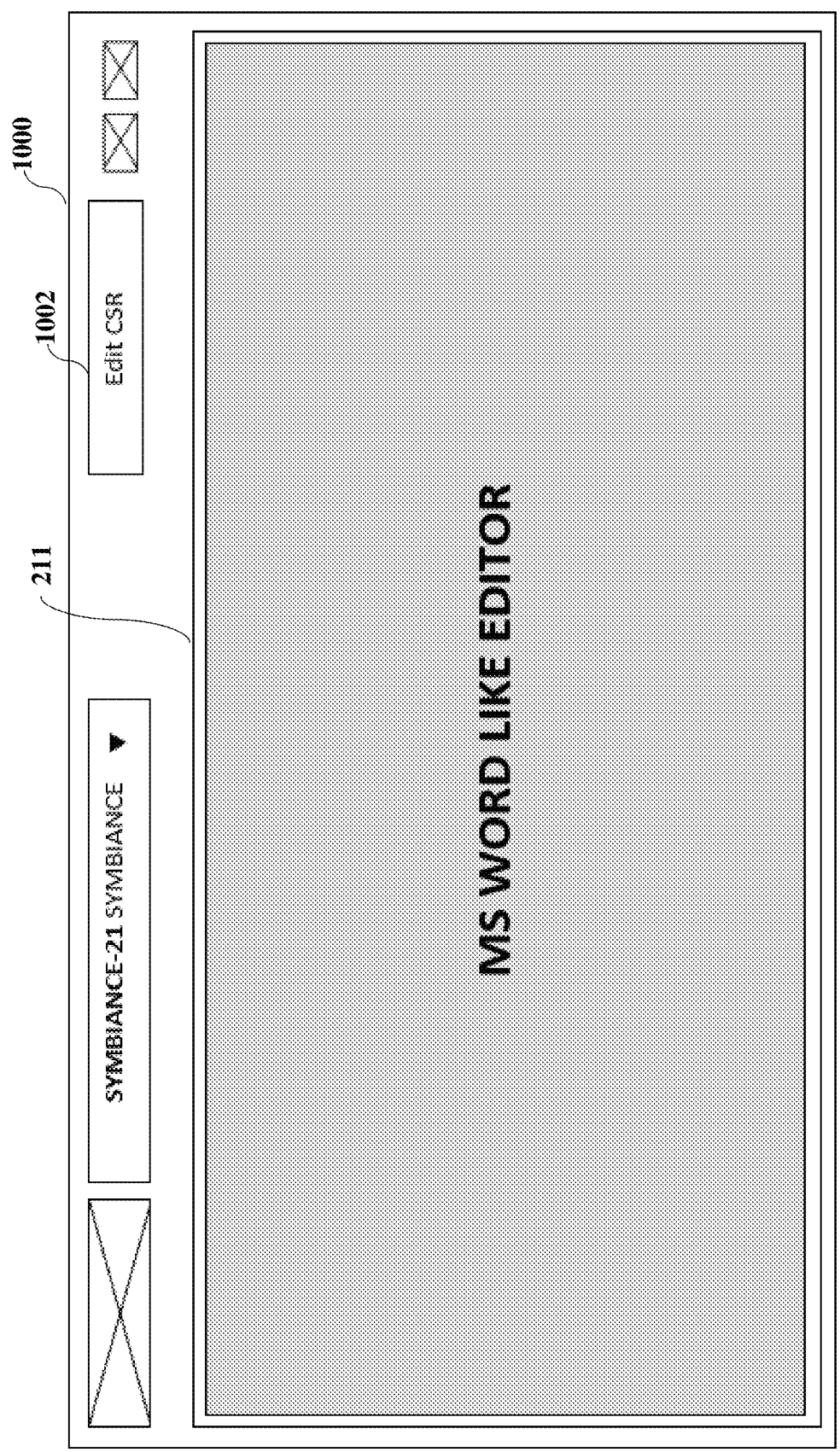
Figure 10S:
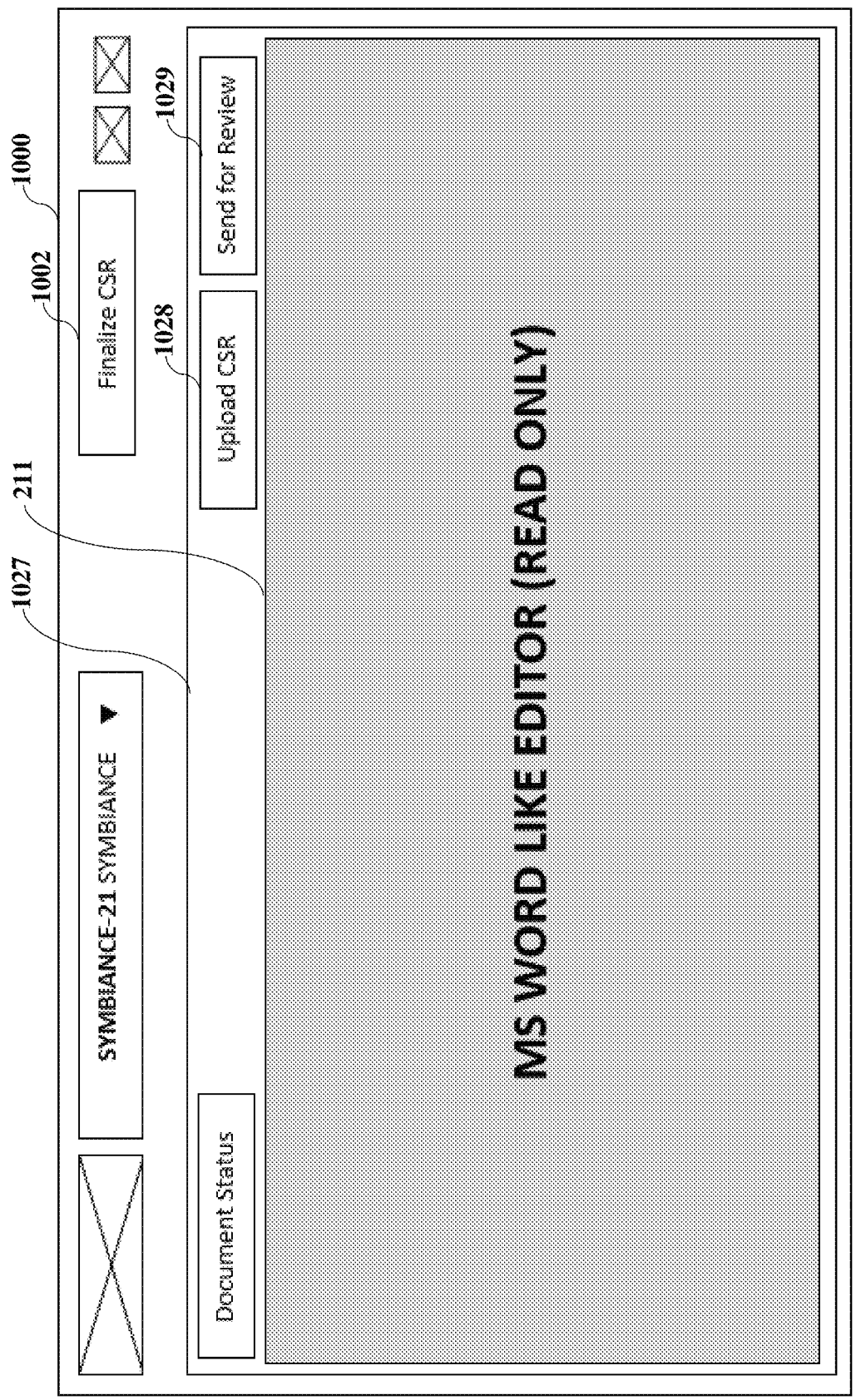
Figure 10T:
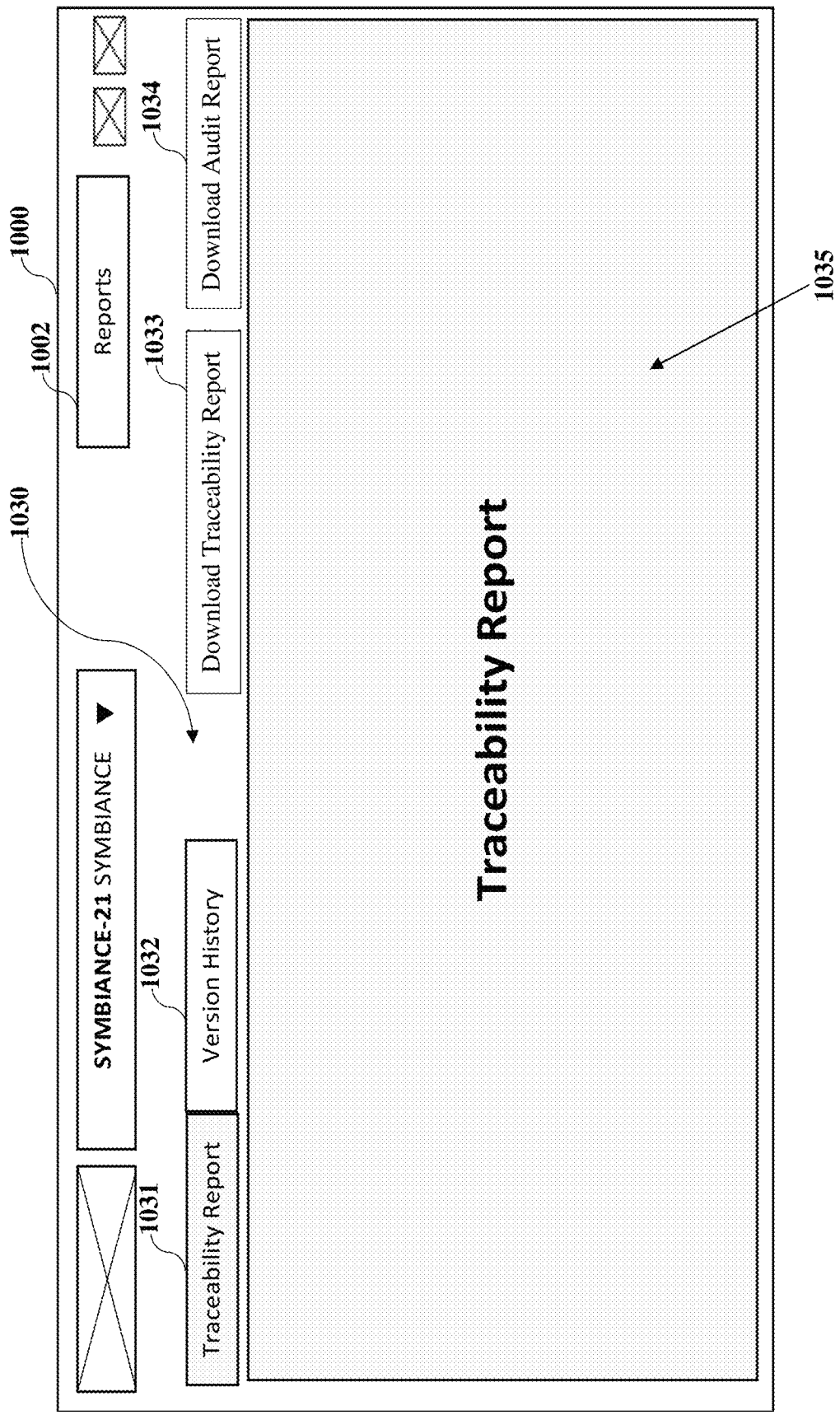
Figure 10V:
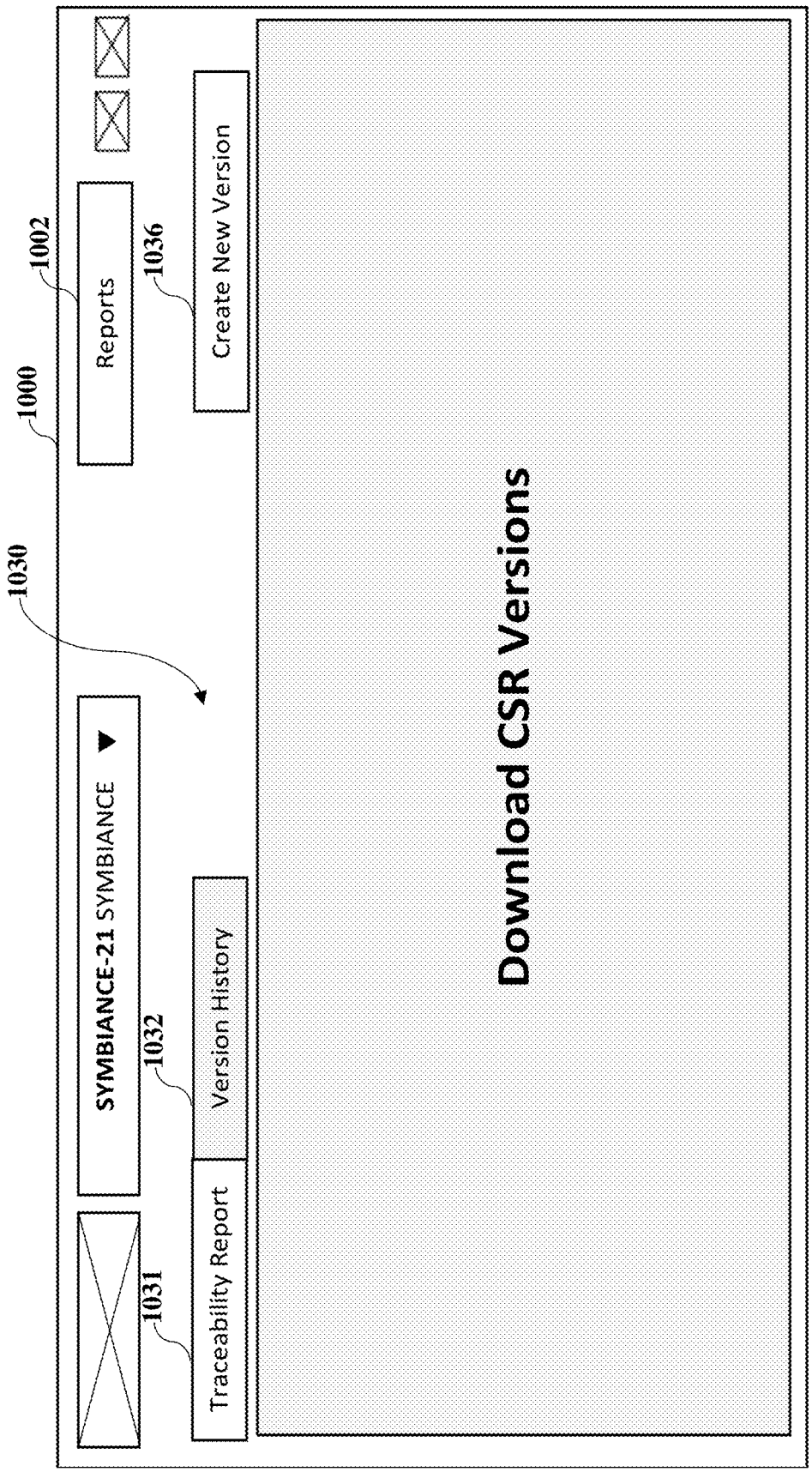

FIGS. 10A-10V exemplarily illustrate different pages of a graphical user interface (GUI) 1000 rendered by the automated authoring engine 909 of the AI-enabled system 200 shown in FIG. 9, for automatically authoring a scientific document using a machine learning model and natural language processing with minimal user intervention. Consider an example where a user logs into the automated authoring engine 909 for generating a clinical study report (CSR). The automated authoring engine 909 renders a "Home" page 1001 on the GUI 1000 as exemplarily illustrated in FIG. 10A, after authenticating the user's login credentials. The "Home" page 1001 displays a dropdown menu 1002 comprising multiple options, for example, "Source Documents", "Edit CSR", "Finalize CSR", and "Reports". The "Home" page 1001 also displays a "Select Project/Study" pop-up window 1003 comprising user interface elements, for example, buttons, for allowing the user to initiate creation of a project and a clinical study report. By clicking a "+New Project" button 1003a and a "+New Study" button 1003b in the "Select Project/Study" pop-up window 1003, the user creates a new project and a new clinical study under the project respectively. After creating the new clinical study, the user selects the project and the clinical study to launch a CSR template page 1004 as exemplarily illustrated in FIG. 10B. The CSR template page 1004 allows the user to configure the template of the CSR.

In an embodiment, the automated authoring engine 909 renders predefined CSR templates based on regulatory authority guidelines, for example, the International Council for Harmonisation of Technical Requirements for Pharmaceuticals for Human Use (ICH) E3 guidelines. The automated authoring engine 909 renders predefined CSR templates of different types, for example, a general CSR template type and a Pharmacokinetic/Pharmacodynamic (PK/PD) CSR template type. Based on the user's selection, the automated authoring engine 909 displays the predefined CSR template of the selected type on the CSR template page 1004. The CSR template page 1004 displays the predefined CSR template of the selected type comprising multiple sections and sub-sections, for example, based on the ICH E3 guidelines. In an embodiment, the CSR template page 1004 does not allow the user to edit the main sections, that is, the fixed sections or the Heading Level 1 sections of the predefined CSR template. The CSR template page 1004 allows the user to configure, that is, add, modify, or delete one or more sub-sections under the fixed sections of the predefined CSR template based on the requirements for each individual clinical study. The CSR template page 1004 displays add, edit, and delete icons 1005 near the section names in the predefined CSR template to allow the user to perform the required actions.

In an example, the user creates a project named as "Symbiance" and a clinical study named as "Symbiance-21". When the user selects the project "Symbiance" and the clinical study "Symbiance-21" on the "Home" page 1001, the automated authoring engine 909 launches the CSR template page 1004 as exemplarily illustrated in FIG. 10C. The CSR template page 1004 displays a predefined CSR template comprising fixed sections, for example, title page, study synopsis, table of contents, list of abbreviations and definition of terms, ethics and regulatory approval, investigators and study administrative structure, introduction, and study objectives as exemplarily illustrated in FIG. 10C. The predefined CSR template further comprises sub-sections, for example, primary objective and secondary objective under the fixed section "study objectives" as exemplarily illustrated in FIG. 10C. By using the add, edit, and delete icons 1005 near the corresponding section name, the user adds another sub-section, for example, Section 8.3 Exploratory Objective, under the fixed section "study objectives" in the predefined CSR template as exemplarily illustrated in FIG. 10C. The automated authoring engine 909 adds "Section 8.3 Exploratory Objective" to the predefined CSR template as a user-added sub-section.

When the user selects the "Source Documents" option from the dropdown menu 1002 on the "Home" page 1001 exemplarily illustrated in FIG. 10A, the automated authoring engine 909 displays a "Source Documents" page 1006 on the GUI 1000 as exemplarily illustrated in FIG. 10D. The "Source Documents" page 1006 provides a "Source Documents" tab 1007 for allowing the user to upload source documents and a "Find & Retrieve" tab 1008 for allowing the user to fetch and display, in response to a user input, additional information from the source documents for selection and rendering into one or more of the sections in the predefined CSR template. When the user selects and clicks or taps on the "Source Documents" tab 1007, the automated authoring engine 909 displays the type of source documents, for example, protocol, statistical analysis plan (SAP), safety narrative, in-text table, synopsis, etc., that the user can upload for section mapping and automatic generation of the CSR as exemplarily illustrated in FIG. 10D. The "Source Documents" tab 1007 provides a "Select File" button 1009 for allowing the user to select and upload each type of source document. The "Source Documents" tab 1007 also provides user interface elements, for example, buttons 1010, 1011, and 1012, for generating the CSR, downloading the CSR, and deleting the source documents respectively. After selecting and uploading the source documents, the user may click the "Generate CSR" button 1010 in the "Source Documents" tab 1007 to process the system generated CSR. Once the CSR processing is completed, the automated authoring engine 909 launches an "Edit CSR" page, herein referred to as the CSR editor 211, exemplarily illustrated in FIG. 10K. The user may also download the generated CSR using the "Download CSR" button 1011 in the "Source Documents" tab 1007. The user may also delete all the source documents using the "Delete All" button 1012 in the "Source Documents" tab 1007.

When the user selects and clicks or taps on the "Find & Retrieve" tab 1008, the automated authoring engine 909 allows the user to search and fetch additional information for the source documents. The automated authoring engine 909 fetches the additional information from the source documents using the find and retrieve engine 921 exemplarily illustrated in FIG. 9. The "Find & Retrieve" tab 1008 allows the user to search content from the uploaded source documents using keywords. The "Find & Retrieve" tab 1008 provides a user interface element, for example, an icon 1013, near each sub-section name as exemplarily illustrated in FIG. 10E, to allow the user to search content using keywords. When the user clicks on the icon 1013, the automated authoring engine 909 invokes the find and retrieve engine 921, and launches a find and retrieve window 1014 that allows the user to enter one or more keywords as exemplarily illustrated in FIG. 10F. The find and retrieve window 1014 allows the user to search for sentences containing the keyword(s) and select the sentences matching the keyword(s) displayed in the find and retrieve window 1014. When the user enters the keyword(s) in an input field 1015 of the find and retrieve window 1014, the find and retrieve engine 921 searches the content of the source documents and displays search results 1016 containing the keyword(s) in the find and retrieve window 1014 as exemplarily illustrated in FIG. 10F. In an embodiment, searching the keyword lists the matching section names in the search results 1016 based on matching criteria. When the user selects a section name from the search results 1016 in the find and retrieve window 1014, the find and retrieve engine 921 displays the content of the selected section containing the keyword(s) in a display area 1017 in the find and retrieve window 1014 as exemplarily illustrated in FIG. 10G. In an embodiment, the find and retrieve window 1014 allows the user to highlight the sentences that are to be copied from the source document into the appropriate section of the predefined CSR template. The find and retrieve window 1014 provides a "Submit" button 1018 in the find and retrieve window 1014 to allow the user to insert the highlighted content into the relevant section of the predefined CSR template.

Consider an example where the user wishes to enter a "Treatment Phase" section from a protocol document into a section "9.4 Treatments" of the predefined CSR template. The user enters the keywords "Treatment phase" in the input field 1015 of the find and retrieve window 1014, for searching in the protocol document as exemplarily illustrated in FIG. 10F. The find and retrieve engine 921 searches the content of the protocol document and displays search results 1016 containing the keywords "Treatment phase" in the find and retrieve window 1014 as exemplarily illustrated in FIG. 10F. Searching the keywords "Treatment phase" lists the matching section names in the search results 1016 based on matching criteria. For example, the find and retrieve engine 921 displays, for example, 9.1.1 Pretreatment Phase, 9.1.2 Treatment Phase, 9.1.3 Extension Phase, 9.4 Treatment, and 9.4.1 Treatments Administered as the search results 1016 in the find and retrieve window 1014. When the user selects a section name, for example, 9.1.2 Treatment Phase, from the search results 1016 in the find and retrieve window 1014, the find and retrieve engine 921 displays the content of the selected section 9.1.2 Treatment Phase containing the keywords "Treatment phase" in a display area 1017 in the find and retrieve window 1014 as exemplarily illustrated in FIG. 10G. FIG. 10H exemplarily illustrates the section 1019 from the protocol document where the keywords "Treatment phase" were found by the find and retrieve engine 921 and selected by the user. The user then clicks the "Submit" button 1018 in the find and retrieve window 1014 exemplarily illustrated in FIG. 10G, to insert the content from the section 1019 of the protocol document exemplarily illustrated in FIG. 10H into the relevant section, for example, "9.4 Treatments" of the predefined CSR template. FIG. 10I exemplarily illustrates the section "9.4 Treatments" of the predefined CSR template in the CSR editor 211 as rendered in the predefined CSR template before the user submits the section 1019 found by the find and retrieve engine 921. FIG.

10J exemplarily illustrates the section 1019 from the protocol document where the keywords "Treatment phase" were found by the find and retrieve engine 921 inserted into the section "9.4 Treatments" of the predefined CSR template in the CSR editor 211, after the user clicks the "Submit" button 1018 in the find and retrieve window 1014 exemplarily illustrated in FIG. 10G.

When the user selects the "Edit CSR" option from the dropdown menu 1002 on the "Home" page 1001 exemplarily illustrated in FIG. 10A, the automated authoring engine 909 displays the CSR editor 211 on the GUI 1000 as exemplarily illustrated in FIG. 10K. In an embodiment, the CSR editor 211 is similar to the Microsoft® Word® editor of Microsoft Corporation. The CSR editor 211 allows the user to view and edit the CSR automatically generated by the automated authoring engine 909. In an embodiment, the CSR editor 211 provides flexibility in viewing and editing the CSR similar to working with the Microsoft® Word© editor.

In an embodiment, the automated authoring engine 909 configures a predefined template for the Title and Synopsis page of the CSR, which is customizable. Using natural language processing, the automated authoring engine 909 maps data fields in the title and synopsis template from a source document. FIG. 10L exemplarily illustrates a title page 1021 generated by the automated authoring engine 909, where data fields, for example, Study Title, Investigational Drug Name, Indication, Protocol Number, etc., are mapped from an uploaded source document. The automated authoring engine 909 highlights the data fields that need the user's attention in a particular color as exemplarily illustrated in FIG. 10L. In an embodiment, the automated authoring engine 909 performs title page and synopsis optimization. The automated authoring engine 909 identifies keywords as entities by using a custom entity recognition model and in an embodiment, by using a spaCy® tokenizer of ExplosionAI UG. The automated authoring engine 909 captures and utilizes user-added answers for retraining the custom entity recognition model and in a subsequent run of the retrained custom entity recognition model, optimizes the title page and synopsis.

The section mapper 206 of the automated authoring engine 909 exemplarily illustrated in FIG. 2 and FIG. 9, maps the section name and content extracted from the source documents to the predefined CSR template using the custom section mapping algorithm disclosed in the description of FIG. 5. The section mapper 206 finds the nearest match and maps the sections. FIG. 10M exemplarily illustrates a section 1022 from the protocol document to be mapped into the predefined CSR template. FIG. 10N exemplarily illustrates the section 1022 from the protocol document mapped into the predefined CSR template. In an embodiment, using natural language generation (NLG), the automated authoring engine 909 converts the tenses of the content mapped into the predefined CSR template. For example, while generating the CSR, if the user enables a "tenses" option, the automated authoring engine 909 converts the tenses of the content in the CSR from present tense to past tense. FIG. 10O exemplarily illustrates a section 1023 from the protocol document to be mapped into the predefined CSR template, where the content in the section 1023 is in the present tense. FIG. 10P exemplarily illustrates the section 1024 from the protocol document mapped into the predefined CSR template, after application of tenses, where the content in the section 1024 has been converted into the past tense.

In an embodiment, the section mapper 206 maps in-text tables uploaded by the user to the corresponding sections in the predefined CSR template. The in-text table interpreter 922 of the automated authoring engine 909 exemplarily illustrated in FIG. 9, generates a summary 1025 for the mapped in-text tables and highlights the in-text table summary 1025 in a particular color as exemplarily illustrated in FIG. 10Q. During the configuration of the predefined CSR template, the user added a sub-section "8.3 Exploratory Objective" under the main section "Study Objectives" as exemplarily illustrated in FIG. 10C. FIG. 10R exemplarily illustrates the user-added section "8.3 Exploratory Objective" and its corresponding content 1026 in the predefined CSR template. The automated authoring engine 909 maps the section name "8.3 Exploratory Objective" in the predefined CSR template with the source document and returns the mapping output.

When the user selects the "Finalize CSR" option from the dropdown menu 1002 on the "Home" page 1001 exemplarily illustrated in FIG. 10A, the automated authoring engine 909 displays the automatically generated CSR in a "Finalize CSR" page 1027 comprising the CSR editor 211 on the GUI 1000 as exemplarily illustrated in FIG. 10S. The CSR editor 211 allows the user to preview and finalize the CSR. The "Finalize CSR" page 1027 provides options to upload the CSR and send the CSR for review for example, via electronic mail (email). If the user downloads and edits the CSR on a user device, then the user needs to click an "Upload CSR" button 1028 on the "Finalize CSR" page 1027 to import the CSR into the automated authoring engine 909 and click a "Send for Review" button 1029 on the "Finalize CSR" page 1027 to send the imported CSR for review.

When the user selects the "Reports" option from the dropdown menu 1002 on the "Home" page 1001 exemplarily illustrated in FIG. 10A, the automated authoring engine 909 displays the "Reports" page 1030 comprising a "Traceability Report" tab 1031 and a "Version History" tab 1032 on the GUI 1000 as exemplarily illustrated in FIG. 10T. Clicking the "Traceability Report" tab 1031 displays the traceability report 1035 generated by the automated authoring engine 909. The traceability report 1035 contains source section mappings of the final CSR. The traceability report 1035 displays the final mapping from the sections in the source document(s) to target sections in the CSR template. The traceability report 1035 is used for viewing details about the extracted content that explains from which source document the section has been extracted and mapped into the CSR. The traceability report 1035 displays the section name and the corresponding source document from where the sections have been extracted and populated in the generated CSR as exemplarily illustrate in FIG. 10U. For example, the traceability report 1035 displays the section name "List of Abbreviations and Definition of Terms" and the corresponding source documents such as the statistical analysis plan and the protocol document, from where the sections have been extracted and populated in the generated CSR as exemplarily illustrate in FIG. 10U. The "Reports" page 1030 provides options to download the traceability report 1035 and an audit report generated by the automated authoring engine 909. The user may click on a "Download Traceability Report" button 1033 on the "Reports" page 1030 to download the traceability report 1035. The user may click on a "Download Audit Report" button 1034 on the "Reports" page 1030 to download the audit report. The audit report records the actions performed in the clinical study. Clicking the "Version History" tab 1032 displays all the versions of the CSR as exemplarily illustrated in FIG. 10V and provides an option to download the CSR based on the version created. The "Version History" tab 1032 also provides an option to create a new version of the CSR via a "Create New Version" button 1036 provided on the "Reports" page 1030.

Figure 11:
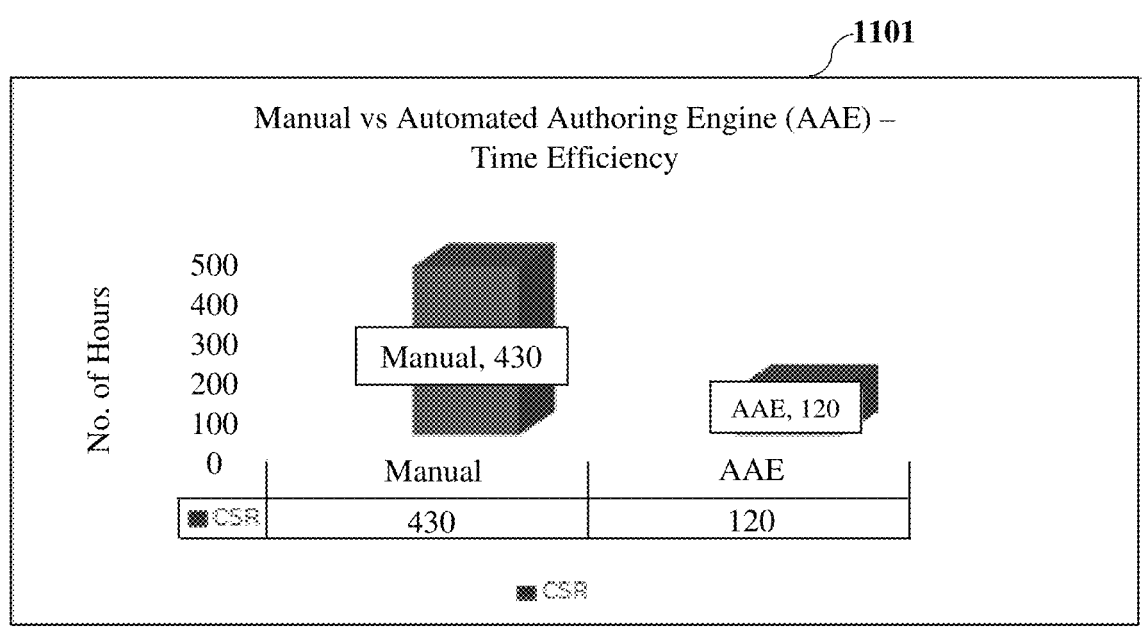
FIG. 11 exemplarily illustrates a graphical representation showing a reduction of manual effort and time consumed in automatically authoring a scientific document using the automated authoring engine of the AI-enabled system.

FIG. 11 exemplarily illustrates a graphical representation 1101 showing a reduction of manual effort and time consumed in automatically authoring a scientific document, for example, a clinical study report (CSR), using the automated authoring engine (AAE) 909 of the artificial intelligence (AI)-enabled system 200 shown in FIG. 9. The AI-enabled system 200 implements AI techniques, for example, using a machine learning model and natural language processing, to extract content from source documents and automatically author the CSR. As exemplarily illustrated in FIG. 11, the automated authoring engine 909 takes about 120 hours to automatically generate the CSR, while a medical writer takes about 430 hours to manually write or type the CSR. The automated authoring engine 909, therefore, substantially reduces the time and effort required to author the CSR. The evolving AI techniques implemented herein based on repeated and continuous learning, training, and retraining of the machine learning models through dynamic real-time data, for example, user feedback for section configuration, user input for incorporating additional information in the CSR, user-added answers for retraining custom entity recognition models, etc., are far beyond what a human medical writer can accomplish in a reasonable and practical manner. The AI-enabled system 200 saves, for example, about 60% to about 70% of a medical writer's time.

The focus of the AI-enabled system 200 and the method disclosed herein is on an improvement to computer-related functionality for automatically authoring documents, particularly, lengthy scientific documents, using a machine learning model and natural language processing, and not on economic or other tasks for which a generic computer is used in its ordinary capacity. Accordingly, the AI-enabled system 200 and the method disclosed herein are not directed to an abstract idea. Rather, the AI-enabled system 200 and the method disclosed herein are directed to a specific improvement to the way the automated authoring engine 909 of the AI-enabled system 200 operates, embodied in, for example, configuring a scientific document template comprising multiple sections based on scientific document requirements; receiving and storing source documents in the source database 802 exemplarily illustrated in FIGS. 8-9; automatically extracting and pre-processing content from the source documents using natural language processing; mapping the sections configured in the scientific document template with the content from the source documents by executing a section mapping algorithm; automatically generating the scientific document by rendering the content from the source documents into the predicted sections of the scientific document template; and executing one or more content editing functions on the automatically generated scientific document using natural language processing, comprising automatically converting tenses of the content in the automatically generated scientific document based on user preferences by executing a natural language generation algorithm; executing post-text to in-text conversion; interpreting in-text tables from the source documents and generating in-text table summaries by executing a natural language understanding algorithm; etc.

The automated authoring engine 909 and the method disclosed herein, powered by AI and driven by machine learning models including deep learning models and natural language processing techniques, reduce manual efforts and time consumed by users, for example, medical writers, in preparing clinical study reports (CSRs) and other scientific documents substantially, thereby allowing users to focus more on discussion points and interpretations. The automated authoring engine 909 and the method disclosed herein accelerate authoring of scientific documents using machine learning and natural language processing comprising natural language generation (NLG) and natural language understanding (NLU). The automated authoring engine 909 saves the time spent in writing safety narratives and interpretations of study results from tables, listings, and figures (TLFs). Moreover, the automated authoring engine 909 eliminates unwanted content and human error. The automated authoring engine 909 reduces the errors and improves the chances of reaching accuracy with a greater degree of precision. Furthermore, the automated authoring engine 909 allows convenient editing and correcting of scientific documents, identifies and incorporates missing information therewithin, implements efficient co-authoring, corrects grammar, and maintains consistency of language and grammar throughout the scientific documents, while adhering to guidelines defined by regulatory authorities, thereby improving quality of the scientific documents and ensuring quality control.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described such as the source database 802, the metadata database 204, and the section repository 205 exemplarily illustrated in FIGS. 8-9, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A system for automatically authoring a scientific document using a machine learning model and natural language processing, the system comprising:
    at least one processor;
    a non-transitory, computer-readable storage medium operably and communicatively coupled to the at least one processor and configured to store computer program instructions executable by the at least one processor; and
    an automated authoring engine defining the computer program instructions, which when executed by the at least one processor, cause the at least one processor to:
        configure a scientific document template comprising a plurality of sections based on scientific document requirements, wherein one or more of the plurality of sections are configured as feedback to retrain the machine learning model;
        receive a plurality of source documents from a user and store the received source documents in a source database;
        automatically extract and pre-process content from the plurality of source documents using natural language processing;
        map section names in the scientific document template with table of contents in the plurality of source documents by executing a section mapping algorithm, wherein the mapping comprises:
            matching the section names in the scientific document template with the table of contents extracted from the plurality of source documents; and
            predicting appropriate sections from among the plurality of sections in the scientific document template for rendering the content from the plurality of source documents into the scientific document template based on the matching of the section names to the table of contents, using the machine learning model and historical scientific document information acquired from the user;
        automatically generate the scientific document by rendering the content from the plurality of source documents into the predicted sections of the scientific document template; and
        execute one or more of a plurality of content editing functions on the automatically generated scientific document using the natural language processing.

2. The system of claim 1, wherein the plurality of sections of the scientific document template comprises fixed sections and user-configurable sub-sections.

3. The system of claim 1, wherein the plurality of content editing functions comprises:
    automatically converting tenses of the content in the automatically generated scientific document based on user preferences by executing a natural language generation algorithm;

highlighting data fields in the automatically generated scientific document that require attention and editing from the user; and executing post-text to in-text conversion.

4. The system of claim 1, wherein one or more of the computer program instructions defined by the automated authoring engine, when executed by the at least one processor, cause the at least one processor to interpret in-text tables from the plurality of source documents and generate an in-text table summary by executing a natural language understanding algorithm.

5. The system of claim 1, wherein one or more of the computer program instructions defined by the automated authoring engine, when executed by the at least one processor, cause the at least one processor to fetch and display, in response to a user input, additional information from the plurality of source documents for selection and rendering into one or more of the plurality of sections in the scientific document template, wherein the user input is configured as additional feedback to retrain the machine learning model.

6. The system of claim 1, wherein one or more of the computer program instructions defined by the automated authoring engine, when executed by the at least one processor, cause the at least one processor to provide selective access of one of: an entirety of the automatically generated scientific document and one or more sections of the automatically generated scientific document, to one or more co-authors of the automatically generated scientific document for performing one or more actions on the automatically generated scientific document.

7. The system of claim 1, wherein one or more of the computer program instructions defined by the automated authoring engine, when executed by the at least one processor, cause the at least one processor to generate and render a preview of the automatically generated scientific document on a preview screen of a user interface for subsequent editing and automatic regeneration of the scientific document.

8. The system of claim 1, wherein one or more of the computer program instructions defined by the automated authoring engine, when executed by the at least one processor, cause the at least one processor to generate and render one or more of a plurality of reports comprising:

a traceability report configured to display the mapping of the section names with the table of contents of the source documents containing the rendered content;

an audit report configured to record and display actions performed on the automatically generated scientific document; and a version history report configured to display versions of the automatically generated scientific document.

9. The system of claim 1, wherein the scientific document is a clinical study report, and wherein the scientific document requirements based on which the scientific document template is configured comprise regulatory authority guidelines, and wherein the regulatory authority guidelines comprise the International Council for Harmonisation of Technical Requirements for Pharmaceuticals for Human Use (ICH) E3 guidelines defined by the ICH.

10. The system of claim 1, wherein the plurality of source documents comprises a protocol document, a statistical analysis plan document, a case report form, safety narratives, in-text tables, post-text tables, summary reports, and tables, listings, and figures.

11. A method employing an automated authoring engine defining computer program instructions executable by at least one processor for automatically authoring a scientific document using a machine learning model and natural language processing, the method comprising:

configuring a scientific document template comprising a plurality of sections based on scientific document requirements, wherein one or more of the plurality of sections are configured as feedback to retrain the machine learning model;

receiving a plurality of source documents from a user and storing the received source documents in a source database;

automatically extracting and pre-processing content from the plurality of source documents using natural language processing;

mapping section names in the scientific document template with table of contents in the plurality of source documents by executing a section mapping algorithm, wherein the mapping comprises:

matching the section names in the scientific document template with the table of contents extracted from the plurality of source documents; and predicting appropriate sections from among the plurality of sections in the scientific document template for rendering the content from the plurality of source documents into the scientific document template based on the matching of the section names to the table of contents, using the machine learning model and historical scientific document information acquired from the user;

automatically generating the scientific document by rendering the content from the plurality of source documents into the predicted sections of the scientific document template; and executing one or more of a plurality of content editing functions on the automatically generated scientific document using natural language processing.

12. The method of claim 11, wherein the plurality of sections of the scientific document template comprises fixed sections and user-configurable sub-sections.

13. The method of claim 11, wherein the plurality of content editing functions comprises:

automatically converting tenses of the content in the automatically generated scientific document based on user preferences by executing a natural language generation algorithm;

fetching and displaying, in response to a user input, additional information from the plurality of source documents for selection and rendering into one or more of the plurality of sections in the scientific document template, wherein the user input is configured as additional feedback to retrain the machine learning model;

highlighting data fields in the automatically generated scientific document that require attention and editing from the user; and executing post-text to in-text conversion.

14. The method of claim 11, further comprising interpreting in-text tables from the plurality of source documents and generating an in-text table summary by executing a natural language understanding algorithm.

15. The method of claim 11, further comprising providing selective access of one of: an entirety of the automatically generated scientific document and one or more sections of the automatically generated scientific document, to one or more co-authors of the automatically generated scientific document for performing one or more actions on the automatically generated scientific document.

16. The method of claim 11, further comprising generating and rendering a preview of the automatically generated scientific document on a preview screen of a user interface for subsequent editing and automatic regeneration of the scientific document.

17. The method of claim 11, further comprising generating and rendering one or more of a plurality of reports comprising:
   a traceability report configured to display the mapping of the sections with the source documents containing the rendered content;
   an audit report configured to record and display actions performed on the automatically generated scientific document; and
   a version history report configured to display versions of the automatically generated scientific document.

18. A non-transitory, computer-readable storage medium having embodied thereon, computer program instructions executable by at least one processor for automatically authoring a scientific document using a machine learning model and natural language processing, the computer program instructions when executed by the at least one processor cause the at least one processor to:
   configure a scientific document template comprising a plurality of sections based on scientific document requirements, wherein one or more of the plurality of sections are configured as feedback to retrain the machine learning model;
   receive a plurality of source documents from a user and store the received source documents in a source database;
   automatically extract and pre-process content from the plurality of source documents using natural language processing;
   map section names in the scientific document template with table of contents in the plurality of source documents by executing a section mapping algorithm, wherein the mapping comprises:
      matching the section names in the scientific document template with the table of contents extracted from the plurality of source documents; and
      predicting appropriate sections from among the plurality of sections in the scientific document template for rendering the content from the plurality of source documents into the scientific document template based on the matching of the section names to the table of contents, using the machine learning model and historical scientific document information acquired from the user;
   automatically generate the scientific document by rendering the content from the plurality of source documents into the predicted sections of the scientific document template; and
   execute one or more of a plurality of content editing functions on the automatically generated scientific document using natural language processing.

19. The non-transitory, computer-readable storage medium of claim 18, wherein the plurality of content editing functions comprises:
   automatically converting tenses of the content in the automatically generated scientific document based on user preferences by executing a natural language generation algorithm;
   fetching and displaying, in response to a user input, additional information from the plurality of source documents for selection and rendering into one or more of the plurality of sections in the scientific document template, wherein the user input is configured as additional feedback to retrain the machine learning model;
   highlighting data fields in the automatically generated scientific document that require attention and editing from the user; and
   executing post-text to in-text conversion.

20. The non-transitory, computer-readable storage medium of claim 18, wherein one or more of the computer program instructions when executed by the at least one processor further cause the at least one processor to interpret in-text tables from the plurality of source documents and generate an in-text table summary by executing a natural language understanding algorithm.

\* \* \* \* \*